(12) United States Patent
Ahmed

(10) Patent No.: US 11,481,618 B2
(45) Date of Patent: Oct. 25, 2022

(54) OPTIMIZATION APPARATUS AND METHOD FOR CONTROLLING NEURAL NETWORK

(71) Applicant: FUJITSU LIMITED, Kawasaki (JP)

(72) Inventor: Tanvir Ahmed, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 914 days.

(21) Appl. No.: 16/284,123

(22) Filed: Feb. 25, 2019

(65) Prior Publication Data

US 2019/0286981 A1    Sep. 19, 2019

(30) Foreign Application Priority Data

Mar. 15, 2018 (JP) .............................. JP2018-047655

(51) Int. Cl.
*G06N 3/08* (2006.01)
*G06F 9/30* (2018.01)
(Continued)

(52) U.S. Cl.
CPC .............. *G06N 3/08* (2013.01); *G06F 9/3001* (2013.01); *G06N 3/04* (2013.01); *G06N 3/063* (2013.01)

(58) Field of Classification Search
CPC ......... G06F 17/11; G06F 9/3001; G06N 3/04; G06N 3/063; G06N 3/08
See application file for complete search history.

(56) References Cited

U.S. PATENT DOCUMENTS 10,929,750 B2 * 2/2021 Tomita ..................... G06N 3/04
2011/0218944 A1   9/2011 Stephens
(Continued)

FOREIGN PATENT DOCUMENTS

JP    2013-521545    6/2013

OTHER PUBLICATIONS

B. Moons, K. Goetschalckx, N. Van Berckelaer and M. Verheist, "Minimum energy quantized neural networks," 2017 51st Asilomar Conference on Signals, Systems, and Computers, 2017, pp. 1921-1925, doi: 10.1109/ACSSC.2017.8335699. (Year: 2017).*
(Continued)

*Primary Examiner* — Khoa D Doan
*Assistant Examiner* — William C. Dang
(74) *Attorney, Agent, or Firm* — Staas & Halsey LLP

(57) ABSTRACT

Arithmetic processing units individually compute values of a predetermined number of neurons amongst a plurality of neurons in a neural network, where the predetermined number of neurons belong to each arithmetic processing unit, and each of the predetermined number of neurons belonging to an arithmetic processing unit is connected to every other neuron belonging thereto. A control unit causes each arithmetic processing unit to perform the computation by providing dense-connection weight coefficients, which correspond to a dense-connection part of the evaluation function, associated with every connection of two neurons belonging thereto. The control unit calculates changes in energy using sparse-connection weight coefficients, which correspond to a sparse-connection part of the evaluation function, individually associated with a connection of two neurons belonging to different arithmetic processing units. Subsequently, the control unit causes each arithmetic processing unit to perform the computation by providing the changes.

6 Claims, 17 Drawing Sheets

(51) Int. Cl.
    *G06N 3/04*     (2006.01)
    *G06N 3/063*    (2006.01)

(56) References Cited

U.S. PATENT DOCUMENTS

2017/0351947 A1*  12/2017  Tamura .................. G06N 3/063
2018/0018563 A1*  1/2018  Tsukamoto ............... G06F 7/48

OTHER PUBLICATIONS

K. Li, W. Liu, K. Zhao, W. Zhang and L. Liu, "A Novel Dynamic Weight Neural Network Ensemble Model," 2014 International Conference on Identification, Information and Knowledge in the Internet of Things, 2014, pp. 22-27, doi: 10.1109/IIKI.2014.12. (Year: 2014).*

Espacenet English abstract for Japanese Patent Publication No. 2013-521545, published Jun. 10, 2013.

\* cited by examiner

OPTIMIZATION APPARATUS AND METHOD FOR CONTROLLING NEURAL NETWORK

CROSS-REFERENCE TO RELATED APPLICATION

This application is based upon and claims the benefit of priority of the prior Japanese Patent Application No. 2018-047655, filed on Mar. 15, 2018, the entire contents of which are incorporated herein by reference.

FIELD

The embodiments discussed herein are related to an optimization apparatus and a method for controlling thereof.

BACKGROUND

Optimization apparatuses using an Ising energy function (sometimes also called Ising machines or Boltzmann machines) are known as techniques for solving multivariable optimization problems, a task for which von Neumann computers are not very efficient. The optimization apparatuses apply the Ising model, a model representing the behavior of magnetic spins, to an optimization problem to be solved.

The optimization apparatuses are capable of simulating, for example, using a neural network. In that case, each of a plurality of units (bits) included in such an optimization apparatus functions as a neuron for outputting either 0 or 1 according to the state of each of other bits and weight coefficients (also called connection coefficients) each indicating the strength of the connection between the bit and every other bit. The optimization apparatus employs, for example, a stochastic search method using Simulated Annealing to obtain, as the solution, a combination of the state of individual bits for which the aforementioned energy function (also called a cost function or objective function) takes an energy minimum.

A technique has been proposed of parallel implementation of Markov chain Monte Carlo (MCMC), which is a class of stochastic search methods, using a plurality of hardware modules (see, for example, Japanese National Publication of International Patent Application No. 2013-521545). Note that, in this technique, the computation is performed by assigning the same weight coefficient to each of the hardware modules.

Due to hardware constraints, it is conventionally challenging to find an optimal solution by mapping a massive optimization problem to an optimization apparatus with a single circuit that implements a stochastic search. For example, the maximum possible number of neurons is about 1024 (the number of weight coefficients in the case where each neuron is connected to every other neuron amounts to 1024×1024, i.e., about a million).

SUMMARY

According to one aspect, there is provided an optimization apparatus for calculating the minimum of an evaluation function representing energy. The optimization apparatus includes a plurality of arithmetic processing units configured to individually perform computation of values of a predetermined number of neurons amongst a plurality of neurons in a neural network, where the predetermined number of neurons belong to each of the plurality of arithmetic processing units, and each of the predetermined number of neurons belonging to one of the plurality of arithmetic processing units is connected to every other neuron belonging thereto; and a control unit configured to cause each of the plurality of arithmetic processing units to perform the computation by providing the each of the plurality of arithmetic processing units with dense-connection weight coefficients associated with every connection of two neurons belonging thereto, the dense-connection weight coefficients corresponding to a dense-connection part of the evaluation function, and calculate changes in the energy using sparse-connection weight coefficients individually associated with a connection of two neurons belonging to different arithmetic processing units, the sparse-connection weight coefficients corresponding to a sparse-connection part of the evaluation function, and subsequently cause each of the plurality of arithmetic processing units to perform the computation by providing the changes.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
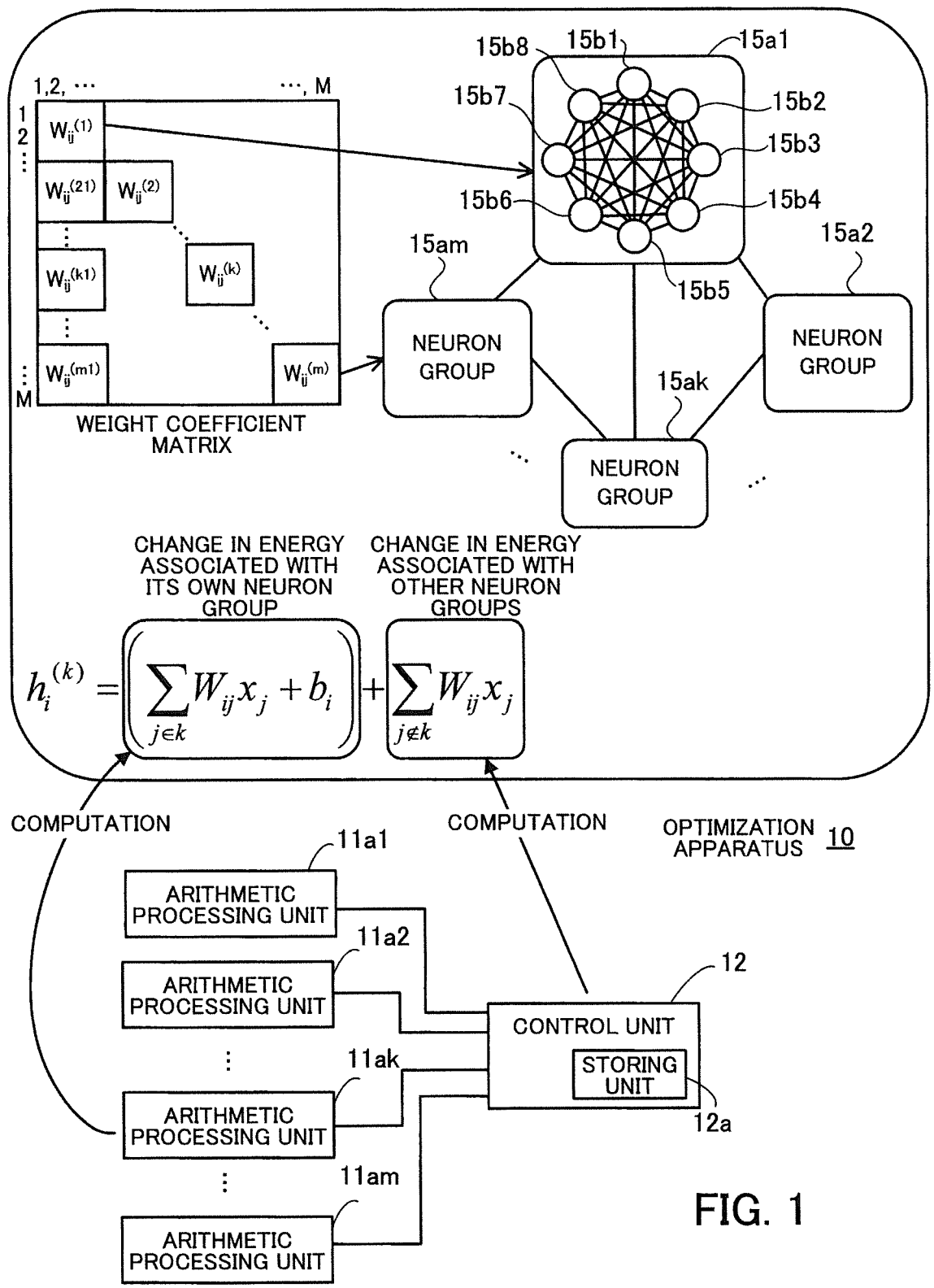
FIG. 1 illustrates an exemplary optimization apparatus according to a first embodiment.

Several embodiments will be described below with reference to the accompanying drawings.

Optimization apparatuses described below solve an optimization problem, such as the travelling salesman problem, by calculating the minimum of an Ising energy function, which is an evaluation function representing energy. In the case where there is a plurality of minima, the lowest minimum is calculated. An Ising energy function $E(x)$ is defined, for example, by the following Expression (1).

$$E(x) = -\sum_{\langle i,j \rangle} W_{ij} x_i x_j - \sum_i b_i x_i \quad (1)$$

The first term on the right side of Expression (1) concerns all possible combinations of two neurons selectable from the entire neurons (all bits), which are mutually exclusive and collectively exhaustive, and represents the sum of the products of values (either 0 or 1) of two neurons of each combination and a weight coefficient of the combination. Here, $x_i$ and $x_j$ are the values of the i-th and j-th neurons, respectively, and $W_{ij}$ is the weight coefficient representing the strength of the connection between the i-th and j-th neurons. Note that $W_{ij} = W_{ji}$ and $W_{ii} = 0$.

The second term on the right side represents the sum of the products of the bias of each of the entire neurons and the value of the neuron. Here, $b_i$ is the bias of the i-th neuron.

A change in energy $\Delta E_i$ associated with a spin flip (a change in the value) of the i-th neuron is defined by the following Expression (2).

$$\Delta E_i = (2x_i - 1) \cdot \left( \sum_j W_{ij} x_j + b_i \right) \quad (2)$$

In Expression (2), $(2x_i - 1)$ takes 1 when the value $x_i$ of the i-th neuron is 1, and takes $-1$ when the value $x_i$ is 0. Note that $h_i$ defined by the following Expression (3) is referred to as the local field, and the change in energy $\Delta E_i$ is given by adding a positive or negative sign to the local field $h_i$ (i.e., multiplying the local field $h_i$ by +1 or -1) according to the value $x_i$.

$$h_i = \sum_j W_{ij} x_j + b_i \quad (3)$$

(a) First Embodiment

FIG. 1 illustrates an exemplary optimization apparatus according to a first embodiment.

An optimization apparatus 10 includes arithmetic processing units 11a1, 11a2, ..., 11ak, ..., and 11am and a control unit 12.

Amongst all neurons, a predetermined number of neurons belong to each of the arithmetic processing units 11a1 to 11am. That is, the arithmetic processing units 11a1 to 11am individually perform computation of values of the predetermined number of neurons. With respect to the predetermined number of neurons belonging to each arithmetic processing unit, weight coefficients are assigned in such a manner that each neuron belonging to the arithmetic processing unit is connected to every other neuron belonging thereto (i.e., all the neurons belonging to the arithmetic processing unit are fully connected). These weight coefficients are hereinafter referred to as dense-connection weight coefficients since they correspond to the dense-connection part of the aforementioned energy function (the part concerning the product-sum operation of the fully-connected neurons).

FIG. 1 depicts an example of a neural network consisting of m neuron groups 15a1, 15a2, ..., 15ak, ..., and 15am. The neuron groups 15a1 to 15am individually belong to their corresponding arithmetic processing units. For example, the neuron group 15a1 belongs to the arithmetic processing unit 11a1; the neuron group 15a2 belongs to the arithmetic processing unit 11a2; the neuron group 15ak belongs to the arithmetic processing unit 11ak; and the neuron group 15am belongs to the arithmetic processing unit 11am. Each of the neuron groups 15a1 to 15am includes the aforementioned predetermined number of neurons.

Supposing that the number of neurons included in each of the neuron groups 15a1 to 15am is n, the total number of neurons M is M=m×n. For example, the neuron group 15a1 includes neurons 15b1, 15b2, 15b3, 15b4, 15b5, 15b6, 15b7, and 15b8. The neurons 15b1 to 15b8 are interconnected to one another, namely, fully connected to each other. In addition, each of the neurons 15b1 to 15b8 is connected to some neurons included in the neuron groups 15a2 to 15am.

The number of connections between neuron groups poses restrictions on mapping an optimization problem (determining weight coefficients, i.e., programming). However, the programming works fine in many cases without difficulty if the number of inter-group connections (i.e., connections between neuron groups) is about 1/10 of the number of intra-group connections (connections within each neuron group), for example, when the number of neurons included in each neuron group, denoted by n, equals to 1024 (n=1024).

For example, supposing that the number of inter-group connections is 128, that is, each neuron is individually connected to 128 neurons in different neuron groups, the number of weight coefficients needed to be determined in each neuron group amounts to $1024^2 + 1024 \times 128$. When the number of neuron groups is, for example, 4, about $4.52 \times 10^6$ weight coefficients are needed to interconnect 1024×4 neurons. Therefore, by limiting the number of inter-group connections, it is possible to reduce the number of weight coefficients needed to be determined. In short, a reduced number of weight coefficients to be stored, for example, in a storing unit 12a of the control unit 12, described later, allows a reduction in the size of the apparatus.

A weight coefficient matrix illustrated in FIG. 1 has weight coefficient groups $(W_{ij}^{(1)}, W_{ij}^{(2)}, \ldots, W_{ij}^{(k)}, \ldots,$ and $W_{ij}^{(m)}$ on its diagonal, each of which is composed of the aforementioned dense-connection weight coefficients each representing the strength of the connection between two neurons included in the corresponding one of the neuron groups 15a1 to 15am. For example, the weight coefficient group $W_{ij}^{(1)}$ is composed of dense-connection weight coefficients, each of which represents the strength of the connection between one of all the possible combinations of two neurons out of the neurons 15b1 to 15b8 included in the neuron group 15a1.

On the other hand, the weight coefficient matrix has weight coefficient groups $(W_{ij}^{(21)}, \ldots, W_{ij}^{(k1)}, \ldots,$ and $W_{ij}^{(m1)}$, for example,) in its off-diagonal cells, each of which is composed of weight coefficients each representing the strength of the connection between neurons belonging to different neuron groups (i.e., different arithmetic processing units). Note that, because neurons belonging to different neuron groups are often not interconnected to each other, as mentioned above, many of the weight coefficients included in weight coefficient groups in the off-diagonal cells take a value of 0. These weight coefficients are hereinafter referred to as sparse-connection weight coefficients since they correspond to the sparse-connection part of the aforementioned energy function (the part concerning the product-sum operation of neurons belonging to different arithmetic processing units).

As for, amongst all the neurons, every combination of two neurons included in the same arithmetic processing unit, the control unit 12 causes the arithmetic processing unit to perform computation by providing dense-connection weight coefficients. As for each combination of two neurons belonging to different arithmetic processing units, the control unit 12 itself calculates the change in energy using a sparse-connection weight coefficient. Then, the control unit 12 provides the different arithmetic processing units with the calculated energy change associated with the two neurons (i.e., sends the energy change to the individual arithmetic processing units) to cause them to perform computation.

The control unit 12 includes the storing unit 12a. The storing unit 12a stores therein, for example, sparse-connection weight coefficients, whose values are determined according to an optimization problem to be solved. The storing unit 12a may store dense-connection weight coefficients. These weight coefficients are provided, for example, by control equipment (not illustrated), such as a computer.

Each of the arithmetic processing units 11a1 to 11am is, for example, a single-chip semiconductor integrated circuit. The control unit 12 is, for example, a controller including an electronic circuit designed for specific use, such as an application specific integrated circuit (ASIC) or a field programmable gate array (FPGA). Note that the control unit 12 may be a processor, such as a central processing unit (CPU) or digital signal processor (DSP). As for the storing unit 12a, volatile memory, such as random access memory (RAM), or non-volatile memory, such as flash memory and electrically erasable programmable read only memory (EEPROM), may be used.

Next described is an exemplary operation performed by the optimization apparatus 10 according to the first embodiment.

The control unit 12 transmits dense-connection weight coefficients to the arithmetic processing units 11a1 to 11am.

Each of the arithmetic processing units 11a1 to 11am performs computation (arithmetic processing for updating values of neurons) using, amongst the dense-connection weight coefficients sent from the control unit 12, those corresponding to the neuron group belonging to itself. The following describes an example of the computation performed by each of the arithmetic processing units 11a1 to 11am.

For example, a local field $h_i^{(k)}$ obtained when the i-th neuron amongst a plurality of neurons included in the k-th neuron group 15ak changes its value is given by the following Expression (4).

$$h_i^{(k)} = \left( \sum_{j \in k} W_{ij} x_j + b_i \right) + \sum_{j \notin k} W_{ij} x_j \qquad (4)$$

On the right side in Expression (4), the sum of the product-sum operation in the first term and the bias in the second term represents a change in energy due to the influence of other neurons included in the k-th neuron group 15ak (i.e., neurons other than the i-th neuron). On the other hand, the product-sum operation in the third term on the right side represents a change in energy due to the influence of neurons not belonging to the neuron group 15ak (neurons belonging to different neuron groups). The former change is hereinafter referred to as an internal local field while the latter change is referred to as an external local field.

The arithmetic processing unit 11ak, to which the k-th neuron group 15ak belongs, calculates the internal local field using dense-connection weight coefficients and values of the neuron group 15ak but does not calculate the external local field.

The arithmetic processing unit 11ak receives an initial value of the local field $h_i^{(k)}$ calculated, for example, by the control unit 12. Then, based on the result of calculating the internal local field, the arithmetic processing unit 11ak updates the local field $h_i^{(k)}$ defined by Expression (4). The arithmetic processing unit 11ak adds, for example, a noise value (random number) to the local field $h_i^{(k)}$ and then compares it with a threshold to thereby determine whether to update the value of the i-th neuron. Based on the determination result, the arithmetic processing unit 11ak updates or maintains the value of the i-th neuron. The arithmetic processing unit 11ak runs this procedure for a predetermined number of iterations with respect to each neuron of the neuron group 15ak. Note that, in order to implement Simulated Annealing, the width of the noise value is controlled to be gradually narrowed in each of the predetermined number of iterations.

Each of the arithmetic processing unit 11a1 to 11am performs the above-described process. Then, after the completion of the predetermined number of iterations for each neuron, the arithmetic processing units 11a1 to 11am individually transmit the value of each neuron to the control unit 12. The control unit 12 then makes calculations of external local fields based on the received value of each neuron and the sparse-connection weight coefficients stored in the storing unit 12a. Subsequently, the control unit 12 transmits the external local fields to the arithmetic processing units 11a1 to 11am.

For example, the arithmetic processing unit 11ak receives, from the control unit 12, the external local field in the third term on the right side of the local field $h_i^{(k)}$ defined by Expression (4). Then, the arithmetic processing unit 11ak uses the external local field as the initial value of the local field $h_i^{(k)}$ to run again, for the predetermined number of iterations, the aforementioned process of updating the local field $h_i^{(k)}$ based on the result of calculating the internal local field.

Such transmission and reception of values of neurons and external local fields are repeated between the arithmetic processing units 11a1 to 11am and the control unit 12 further for a predetermined number of iterations. The values of individual neurons obtained at the end of the iterations are output from the control unit 12 as the solution of the optimization problem.

According to the above-described optimization apparatus 10 of the first embodiment, the computation of the neuron groups 15a1 to 15am, in each of which neurons are densely (fully) connected, is individually performed by their corresponding arithmetic processing units. That is, the optimization apparatus 10 includes a plurality of arithmetic processing units 11a1 to 11am. Then, the control unit 12 performs computation of sparsely-connected neurons belonging to different arithmetic processing units, and the results of the computation (external local fields) are reflected in the computation of the arithmetic processing units 11a1 to 11am. In this manner, it is possible to find an optimal solution by mapping a massive optimization problem to the optimization apparatus 10, which is conventionally difficult for an optimization apparatus with a single circuit that implements a stochastic search.

In addition, the arithmetic processing units 11a1 to 11am need not engage in calculations using sparse-connection weight coefficients, and this reduces the amount of memory used for holding weight coefficients in the arithmetic processing units 11a1 to 11am.

After the completion of a predetermined number of iterations, the arithmetic processing units 11a1 to 11am individually transmit the value of each neuron to the control unit 12. The control unit 12 calculates external local fields based on the received values of neurons and sparse-connection weight coefficients, and transmits the calculated external local fields to the arithmetic processing units 11a1 to 11am. In this manner, it is possible to reduce the communication frequency and the amount of data communication between the arithmetic processing units 11a1 to 11am and the control unit 12. This reduces communication overhead, which is the proportion of time spent on communication during the process of solving the optimization problem, and thus, in turn, reduces the time to solve the optimization problem.

(b) Second Embodiment

Figure 2:
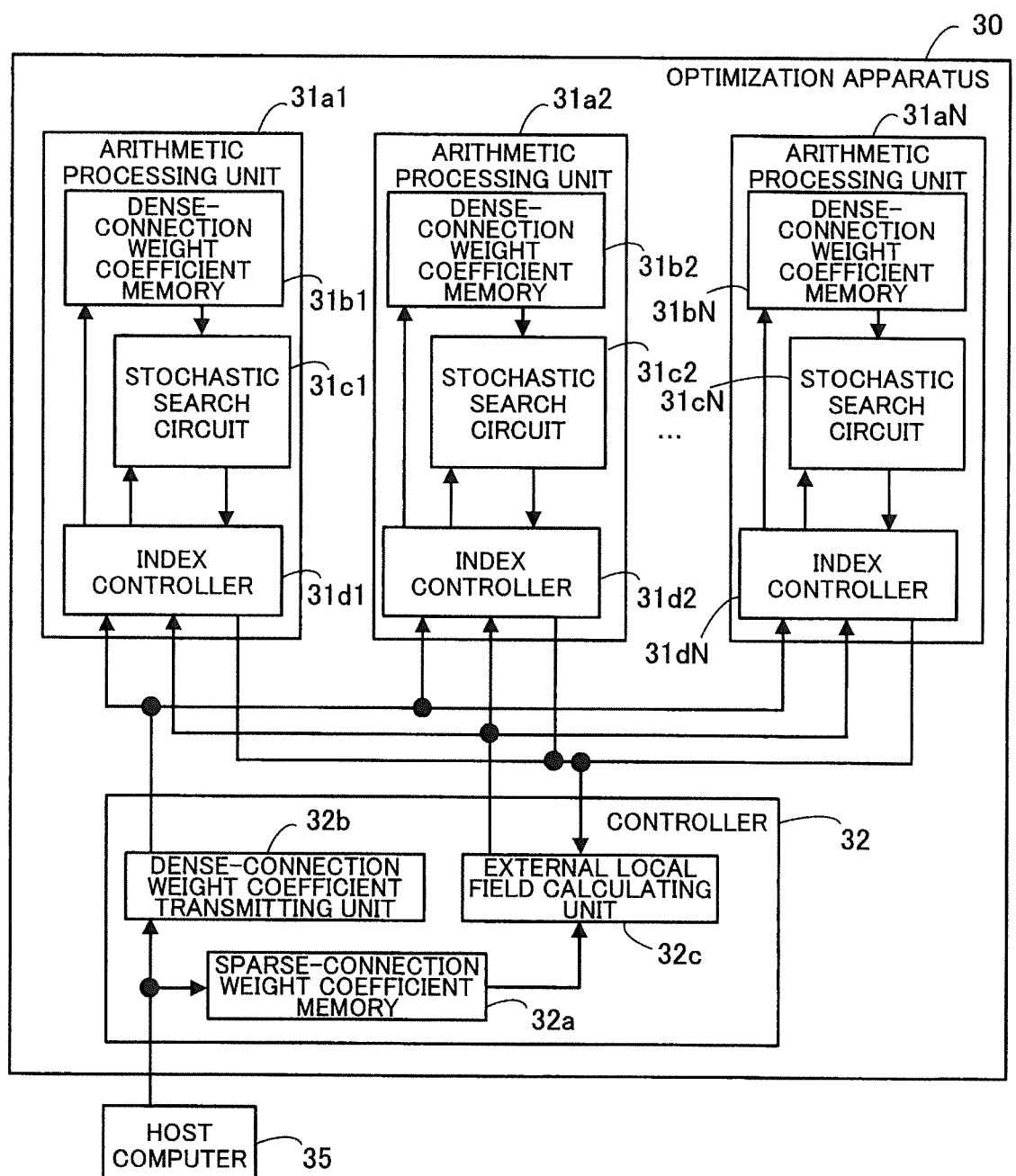
FIG. 2 illustrates an exemplary optimization apparatus according to a second embodiment.

FIG. 2 illustrates an exemplary optimization apparatus according to a second embodiment.

An optimization apparatus 30 includes arithmetic processing units 31a1, 31a2, . . . , and 31aN and a controller 32.

Each of the arithmetic processing units 31a1 to 31aN includes a dense-connection weight coefficient memory, a stochastic search circuit, and an index controller. In the example of FIG. 2, the arithmetic processing unit 31a1 includes a dense-connection weight coefficient memory 31b1, a stochastic search circuit 31c1, and an index controller 31d1. Similarly, the arithmetic processing unit 31a2 includes a dense-connection weight coefficient memory 31b2, a stochastic search circuit 31c2, and an index controller 31d2. Further, the arithmetic processing unit 31aN includes a dense-connection weight coefficient memory 31bN, a stochastic search circuit 31cN, and an index controller 31dN.

Note that each of the arithmetic processing units 31a1 to 31aN is, for example, a single-chip semiconductor integrated circuit.

The following description is directed to the individual elements of the arithmetic processing unit 31a1; however, the same applies to each of the remaining arithmetic processing units 31a2 to 31aN.

The dense-connection weight coefficient memory 31b1 stores therein dense-connection weight coefficients each representing the strength of the connection between neurons included in a neuron group belonging to the arithmetic processing unit 31a1. The dense-connection weight coefficient memory 31b1 may be volatile memory such as RAM, or non-volatile memory such as flash memory and EEPROM.

The stochastic search circuit 31c1 is a circuit for performing update processing using MCMC. The stochastic search circuit 31c1 receives the initial value of the local field $h_i$ or an external local field of each neuron included in the neuron group belonging to the arithmetic processing unit 31a1, and updates the local field $h_i$ based on the results of calculating the internal local field. The stochastic search circuit 31c1 adds, for example, a noise value (random number) to the local field $h_i$, and then compares it with a threshold to thereby determine whether to update the value of the i-th neuron. Based on the determination results, the stochastic search circuit 31c1 updates or maintains the value of the i-th neuron. The stochastic search circuit 31c1 runs this procedure for a predetermined number of iterations with respect to each neuron of the neuron group belonging to the arithmetic processing unit 31a1.

The index controller 31d1 receives, from the controller 32, dense-connection weight coefficients and indexes indicating the connection of two neurons, with which each of the dense-connection weight coefficients is associated. Then, the index controller 31d1 writes the dense-connection weight coefficients to addresses in the dense-connection weight coefficient memory 31b1 according to their indexes.

The index controller 31d1 also receives, from the controller 32, the initial value of the local field $h_i$ or an external local field of each neuron and indexes each indicating a neuron with which the initial value of the local field $h_i$ or the external local field is associated. Then, the index controller 31d1 provides the initial value of the local field $h_i$ or the external local field of each neuron to individual circuit units deployed in the stochastic search circuit 31c1. Each circuit unit is in charge of computation associated with a neuron identified by its corresponding index.

Further, the index controller 31d1 receives a value (state) of each neuron from the stochastic search circuit 31c1, and adds, to each of the values, an index indicating which neuron is associated with the value and then provides the values with their indexes to the controller 32.

Figure 3:
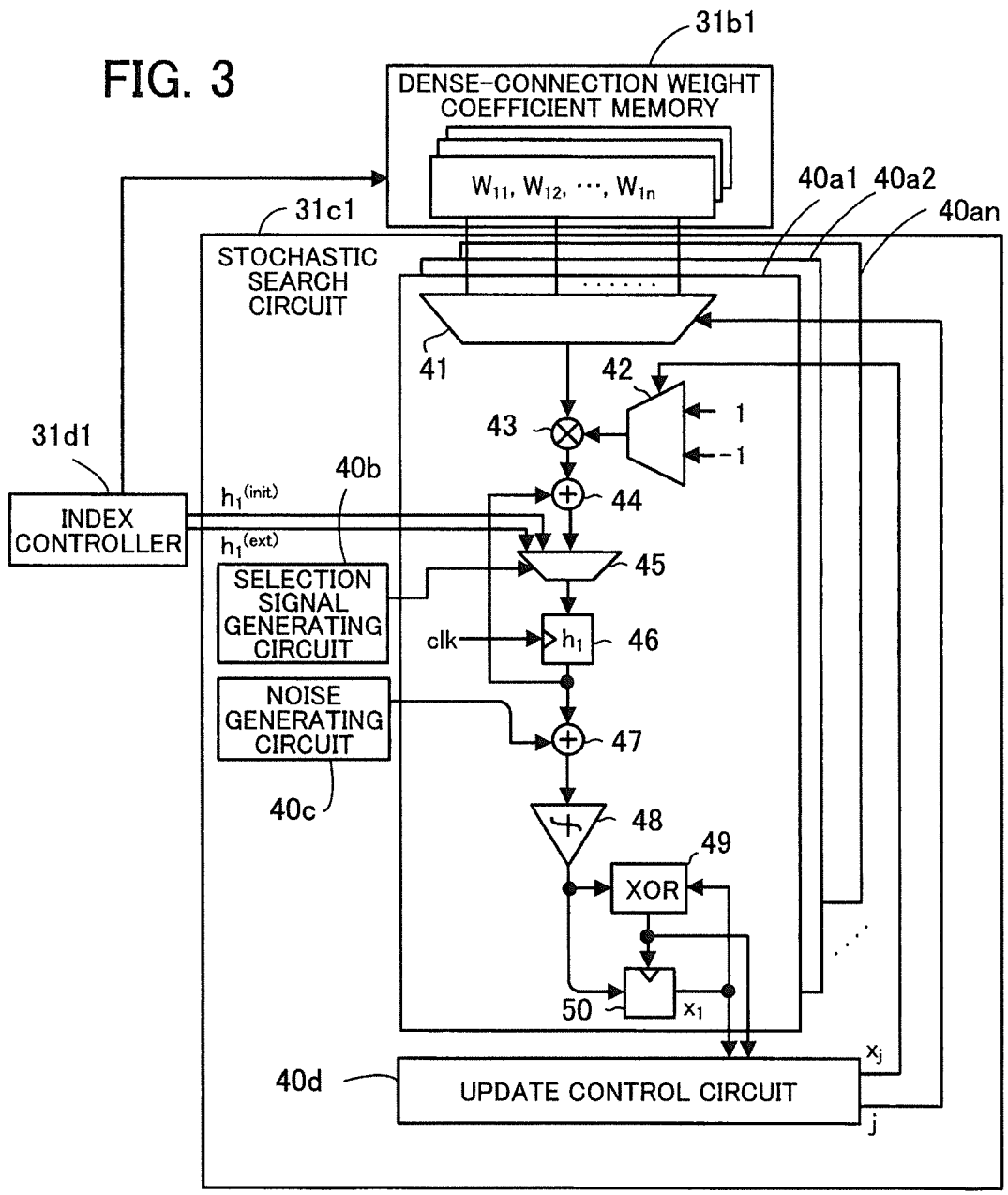
FIG. 3 illustrates an exemplary stochastic search circuit.

FIG. 3 illustrates an exemplary stochastic search circuit.

The exemplary stochastic search circuit 31c1 of FIG. 3 computes an Ising energy function of a neural network using small-scale hardware based on an algorithm called DeGloria algorithm.

The stochastic search circuit 31c1 includes neuron circuits 40a1, 40a2, . . . , and 40an each outputting a value of a neuron, a selection signal generating circuit 40b, a noise generating circuit 40c, and an update control circuit 40d.

The values output from the neuron circuit 40a1 to 40an correspond to, for example, the value of one of the neuron groups 15a1 to 15am illustrated in FIG. 1.

FIG. 3 depicts an example of the neuron circuit 40a1. The remaining neuron circuits 40a2 to 40an may be implemented using similar circuits to the neuron circuit 40a1.

The neuron circuit 40a1 includes selection circuits 41 and 42, a multiplier circuit 43, an adder circuit 44, a selection circuit 45, a register 46, an adder circuit 47, a comparison circuit 48, an exclusive-OR (XOR) circuit 49, and a register 50.

The selection circuit 41 selects and outputs one of dense-connection weight coefficients $W_{11}$, $W_{12}$, . . . , and $W_{1n}$ stored in the dense-connection weight coefficient memory 31b1, based on an index output from the update control circuit 40d.

For example, when the index input to the selection circuit 41 equals to n, the selection circuit 41 selects the dense-connection weight coefficient $W_{1n}$.

In the case of allowing a change in the value of only one neuron at a time in view of computational convergence, as for a connection partner of the neuron whose value is updated, a change in energy due to the update is added to or subtracted from its original local field.

For example, when the value $x_j$ (either 0 or 1) of a neuron whose index is j, which is connected to a neuron whose index is i, has changed to $(1-x_j)$, a change $\Delta h_i$ in the local field of the neuron whose index is i is defined by the following Expression (5).

$$\Delta h_i = h_i|_{x_j \to 1-x_j} - h_i = W_{ij}(1-2x_j) \quad (5)$$

In Expression (5), $(1-2x_j)$ takes +1 when the value $x_j$ changes from 0 to 1 and −1 when it changes from 1 to 0.

The selection circuit 42 is configured to implement computation of $(1-2x_j)$ in Expression (5), and selects and outputs 1 or −1 based on an updated value of a neuron selected by the update control circuit 40d (i.e., a neuron for which value update is allowed). The selection circuit 42 selects and outputs −1 when the updated value is 0 and 1 when the updated value is 1.

The multiplier circuit 43 outputs the product of the weight coefficient output from the selection circuit 41 and the value output from the selected circuit 42.

The adder circuit 44 adds the value output from the multiplier circuit 43 and a value stored in the register 46 and outputs the result.

The selection circuit 45 selects and outputs, based on a selection signal provided by the selection signal generating circuit 40b, one of the value output from the adder circuit 44, an initial value $h_1^{(init)}$ of the local field $h_1$, and an external local field $h_1^{(ext)}$.

The register 46 fetches the value output from the selection circuit 45, in synchronization with a clock signal clk. The register 46 is, for example, a flip-flop. Note that the clock signal clk is provided, for example, by the controller 32.

The adder circuit 47 adds a noise value output from the noise generating circuit 40c to the local field $h_1$ output from the register 46, and outputs the result.

The comparison circuit 48 outputs 0 when the value output from the adder circuit 47 is greater than or equal to a threshold (e.g. 0) and 1 when the value is below the threshold.

The XOR circuit 49 outputs a value indicating whether value update of a neuron whose index is 1 is allowed, based on the value output from the comparison circuit 48 and a value stored in the register 50. For example, when the value output from the comparison circuit 48 matches the value stored in the register 50, the XOR circuit 49 outputs 0 indicating that the value update is not allowed. When the two have different values, on the other hand, the XOR circuit 49 outputs 1 indicating that the value update is allowed.

The resister 50 holds a value $x_1$ of the neuron whose index is 1.

The selection signal generating circuit 40b outputs, at the initial setting of the optimization apparatus 30, a selection signal causing the selection circuit 45 to select the initial value $h_1^{(init)}$ of the local field $h_1$, and outputs, during subsequent iterations after the initialization, a selection signal causing the selection circuit 45 to select the value output from the adder circuit 44. Then, after a predetermined number of iterations, the selection signal generating circuit 40b outputs a selection signal causing the selection circuit to select the external local field $h_1^{(ext)}$. During subsequent iterations, the selection signal generating circuit 40b outputs a selection signal causing the selection circuit 45 to select again the value output from the adder circuit 44.

The noise generating circuit 40c generates the noise value in order to implement Simulated Annealing. As the noise generating circuit 40c, linear feedback shift registers (LFSR), for example, are used. Note that, when Simulated Annealing is implemented, the noise generating circuit 40c gradually reduces the width of noise, for example, under the control of the controller 32.

The update control circuit 40d receives the values $x_1$ to $x_n$ of the neurons whose indexes are 1 to n and the values individually indicating whether the value of each neuron is allowed to be updated, output from the neuron circuits 40a1 to 40an. Then, if, according to the values individually indicating the propriety of updating the value of each neuron, there are one or more neurons for which value update is determined to be allowed, the update control circuit 40d selects one from these neurons. Subsequently, the update control circuit 40d provides the index of the selected neuron and its updated value to the neuron circuits 40a1 to 40an.

For example, in the case where there is a plurality of neurons for which value update is allowed, the update control circuit 40d randomly selects one from the neurons based on a random value, and outputs the index and the updated value of the neuron. FIG. 3 depicts an example where the update control circuit 40d outputs an index of j and the value $x_j$ of the selected neuron.

Figure 4:
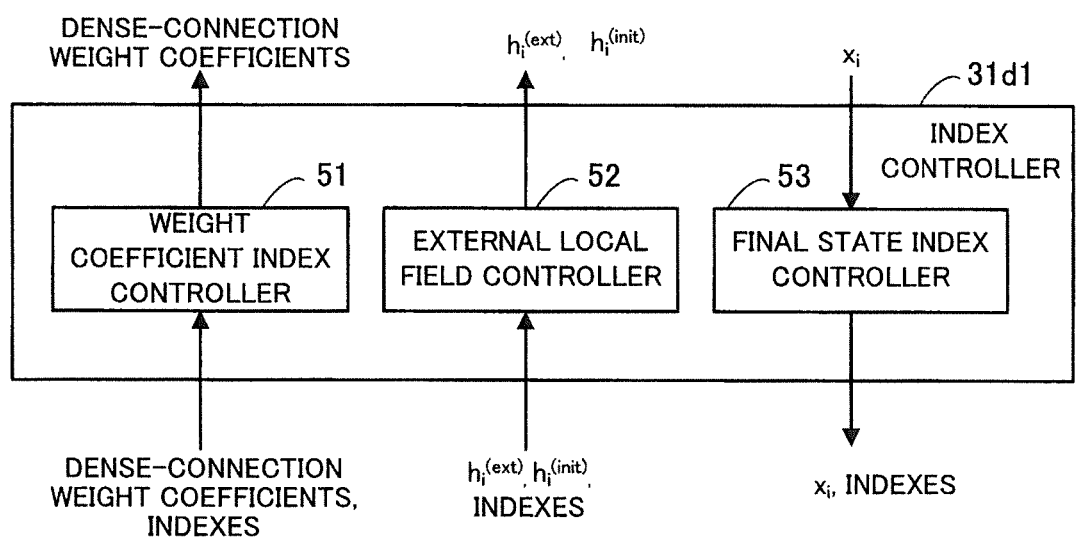
FIG. 4 illustrates an exemplary index controller provided in the optimization apparatus according to the second embodiment.

FIG. 4 illustrates an exemplary index controller provided in the optimization apparatus according to the second embodiment.

The index controller 31d1 includes a weight coefficient index controller 51, an external local field controller 52, and a final state index controller 53.

The weight coefficient index controller 51 receives, from the controller 32, dense-connection weight coefficients and indexes indicating the connection of two neurons, with which each of the dense-connection weight coefficients is associated. Then, the weight coefficient index controller 51 writes the dense-connection weight coefficients to addresses in the dense-connection weight coefficient memory 31b1 according to their indexes.

The external local field controller 52 receives, from the controller 32, an initial value $h_i^{(init)}$ or external local field $h_i^{(ext)}$ of each neuron and indexes each indicating a neuron with which the initial value $h_i^{(init)}$ or the external local field $h_i^{(ext)}$ is associated. Then, the external local field controller 52 provides the initial value $h_i^{(init)}$ or the external local field $h_i^{(ext)}$ of each neuron to, amongst the neuron circuits 40a1 to 40an, a neuron circuit in charge of computation associated with the neuron identified by the corresponding index.

The final state index controller 53 acquires the value $x_i$ of a neuron from a register (e.g. the register 50) of each of the neuron circuits 40a1 to 40an. Subsequently, the final state index controller 53 adds, to each of the values $x_i$, an index indicating which neuron is associated with the value $x_i$, and then provides the values $x_i$ with their indexes to the controller 32.

Figure 5:
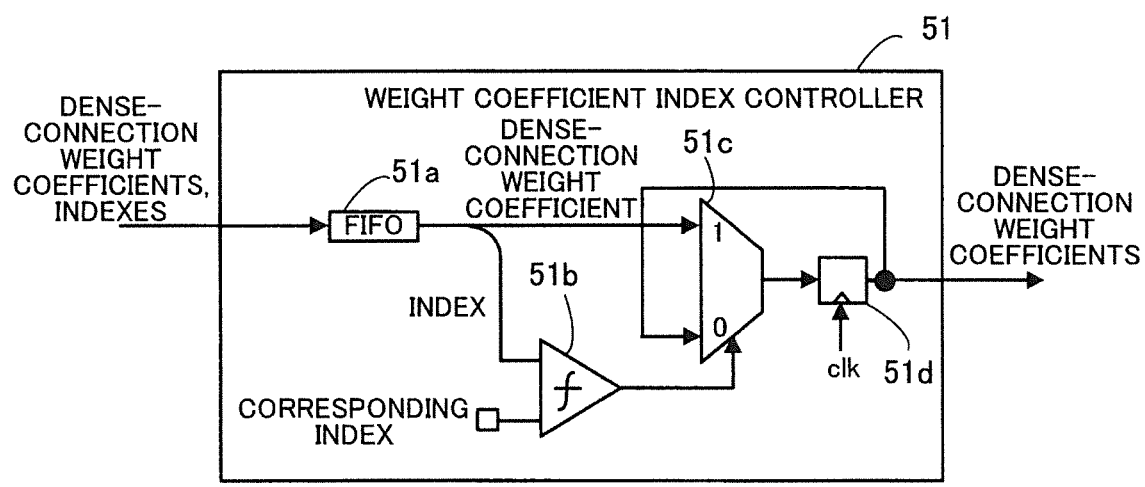
FIG. 5 illustrates an exemplary weight coefficient index controller.

FIG. 5 illustrates an exemplary weight coefficient index controller.

The weight coefficient index controller 51 includes a first-in first-out (FIFO) memory (hereinafter simply referred to as "FIFO") 51a, a comparison circuit 51b, a selection circuit 51c, and a register 51d.

After the dense-connection weight coefficients and their indexes are input to the FIFO 51a, each dense-connection weight coefficient is fed to the selection circuit 51c while its index is fed to the comparison circuit 51b.

The comparison circuit 51b outputs 1 if the index fed thereto matches an index of a weight coefficient associated with the connection between neurons belonging to the arithmetic processing unit 31a1, prestored in a register (not illustrated), for example. The latter index is hereinafter referred to as "corresponding index". On the other hand, the comparison circuit 51b outputs 0 if the index fed thereto does not match the corresponding index.

The selection circuit 51c selects, according to the signal output from the comparison circuit 51b, one of the dense-connection weight coefficient output from the FIFO 51a and a dense-connection weight coefficient stored in the register 51d, and outputs the selected dense-connection weight coefficient. Specifically, the selection circuit 51c selects and outputs the dense-connection weight coefficient output from the FIFO 51a when the comparison circuit 51b outputs 1, and selects and outputs the dense-connection weight coefficient stored in the register 51d when the comparison circuit 51b outputs 0.

The register 51d registers the dense-connection weight coefficient output from the selection circuit 51c, in synchronization with the clock signal clk. The dense-connection weight coefficient held in the register 51d is to be the output of the weight coefficient index controller 51.

The external local field controller 52 of FIG. 4 may be implemented using a similar circuit to the weight coefficient index controller 51 of FIG. 5.

Figure 6:
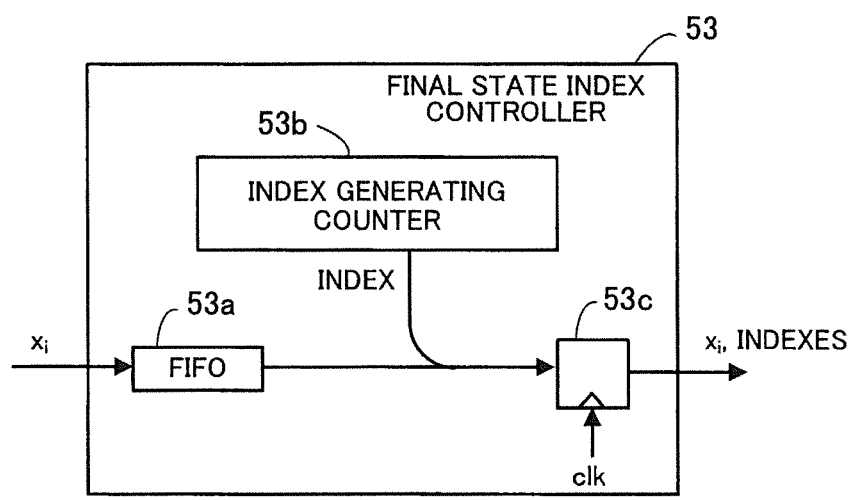
FIG. 6 illustrates an exemplary final state index controller.

FIG. 6 illustrates an exemplary final state index controller.

The final state index controller 53 includes a FIFO 53a, an index generating counter 53b, and a register 53c.

The FIFO 53a acquires the value $x_i$ of each neuron sequentially from individual registers of the neuron circuits 40a1 to 40an and then outputs the individual values $x_i$ in the order of acquisition. The index generating counter 53b outputs an index, and also increments the index to be output therefrom according to the timing of the FIFO 53a outputting each value $x_i$. The register 53c registers therein the value $x_i$ output from the FIFO 53a and an index corresponding to the value $x_i$, in synchronization with the clock signal clk. The value $x_i$ and its corresponding index held in the register 53c are to be the output of the final state index controller 53.

In reference to FIG. 2, the controller 32 includes a sparse-connection weight coefficient memory 32a, a dense-connection weight coefficient transmitting unit 32b, and an external local field calculating unit 32c.

A host computer 35 provides, to the controller 32, dense-connection weight coefficients and their indexes and sparse-connection weight coefficients and their indexes. The sparse-connection weight coefficient memory 32a stores, among the provided data, the sparse-connection weight coefficients and their indexes. The sparse-connection weight coefficient memory 32a may be volatile memory such as RAM, or non-volatile memory such as flash memory and EEPROM. Note that the sparse-connection weight coefficient memory 32a may store therein the dense-connection weight coefficients and their indexes.

The dense-connection weight coefficient transmitting unit 32b transmits (broadcasts) the dense-connection weight coefficients and their indexes to the arithmetic processing units 31a1 to 31aN.

The external local field calculating unit 32c receives values of individual neurons and their indexes from the arithmetic processing units 31a1 to 31aN. Then, the external local field calculating unit 32c calculates the external local field of each neuron based on the received values of all the neurons and their indexes as well as the sparse-connection weight coefficients and their indexes stored in the sparse-connection weight coefficient memory 32a. The external local field calculating unit 32c transmits (broadcasts) the calculated external local fields to the arithmetic processing units 31a1 to 31aN.

Next described is an overall operation flow of the optimization apparatus according to the second embodiment, with reference to a flowchart.

Figure 7:
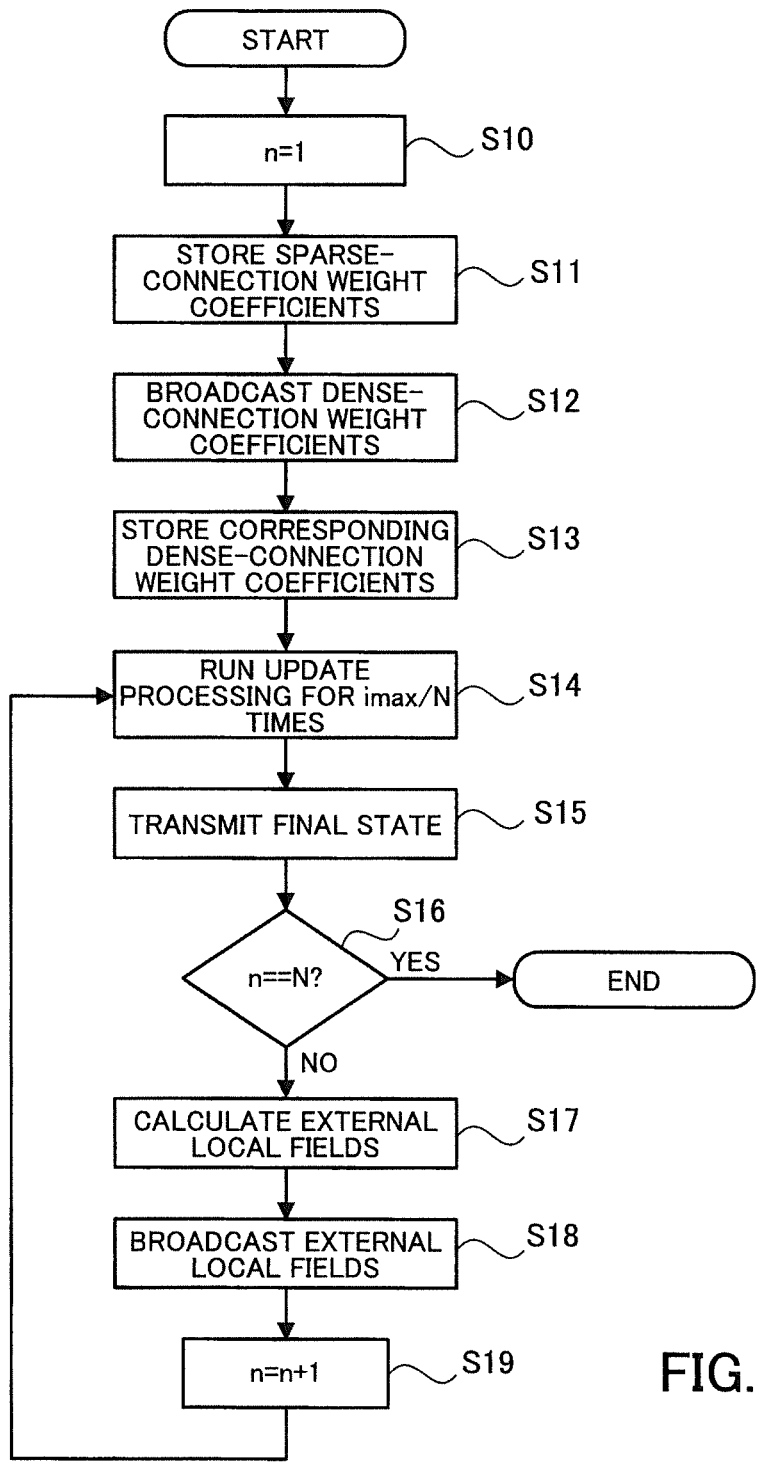
FIG. 7 is a flowchart illustrating an exemplary operation flow of the optimization apparatus according to the second embodiment.

FIG. 7 is a flowchart illustrating an exemplary operation flow of the optimization apparatus according to the second embodiment.

The controller 32 sets a count value n of a counter (not illustrated) to 1 (step S10) and stores, in the sparse-connection weight coefficient memory 32a, sparse-connection weight coefficients (and their indexes) provided by the host computer 35 (step S11). In addition, the controller 32 broadcasts, to the arithmetic processing units 31a1 to 31aN, dense-connection weight coefficients (and their indexes) provided by the host computer 35 (step S12).

The arithmetic processing units 31a1 to 31aN individually store dense-connection weight coefficients associated with their corresponding indexes in the dense-connection weight coefficient memory units 31b1 to 31bN, respectively (step S13), and run update processing for imax/N times (step S14), where imax is the number of iterations deemed to achieve computational convergence and N is the number of the arithmetic processing units 31a1 to 31aN.

Subsequently, each of the arithmetic processing unit 31a1 to 31aN transmits the values of individual neurons belonging to itself (and their indexes) to the controller 32 as the final state (step S15).

The controller 32 determines whether the count value n has reached N (step S16). If the count value n has yet to reach N, the controller 32 calculates external local fields (step S17). Then, the controller 32 broadcasts the calculated external local fields to the arithmetic processing units 31a1 to 31aN (step S18). The controller 32 also increments the count value n (step S19). Subsequently, the process returns to step S14 to be repeated.

When the count value n has reached N, the optimization apparatus 30 ends the process of solving the optimization problem. Note that, when the count value n has reached N, for example, the controller 32 transmits the value of each neuron obtained at that point to the host computer 35 as the solution of the optimization problem.

The above-described optimization apparatus 30 of the second embodiment achieves the same effect as the optimization apparatus 10 of the first embodiment. In addition, since each of the index controllers 31d1 to 31dN has one-on-one communication with the controller 32, it is possible to implement them using comparatively small circuits.

(c) Third Embodiment

Figure 8:
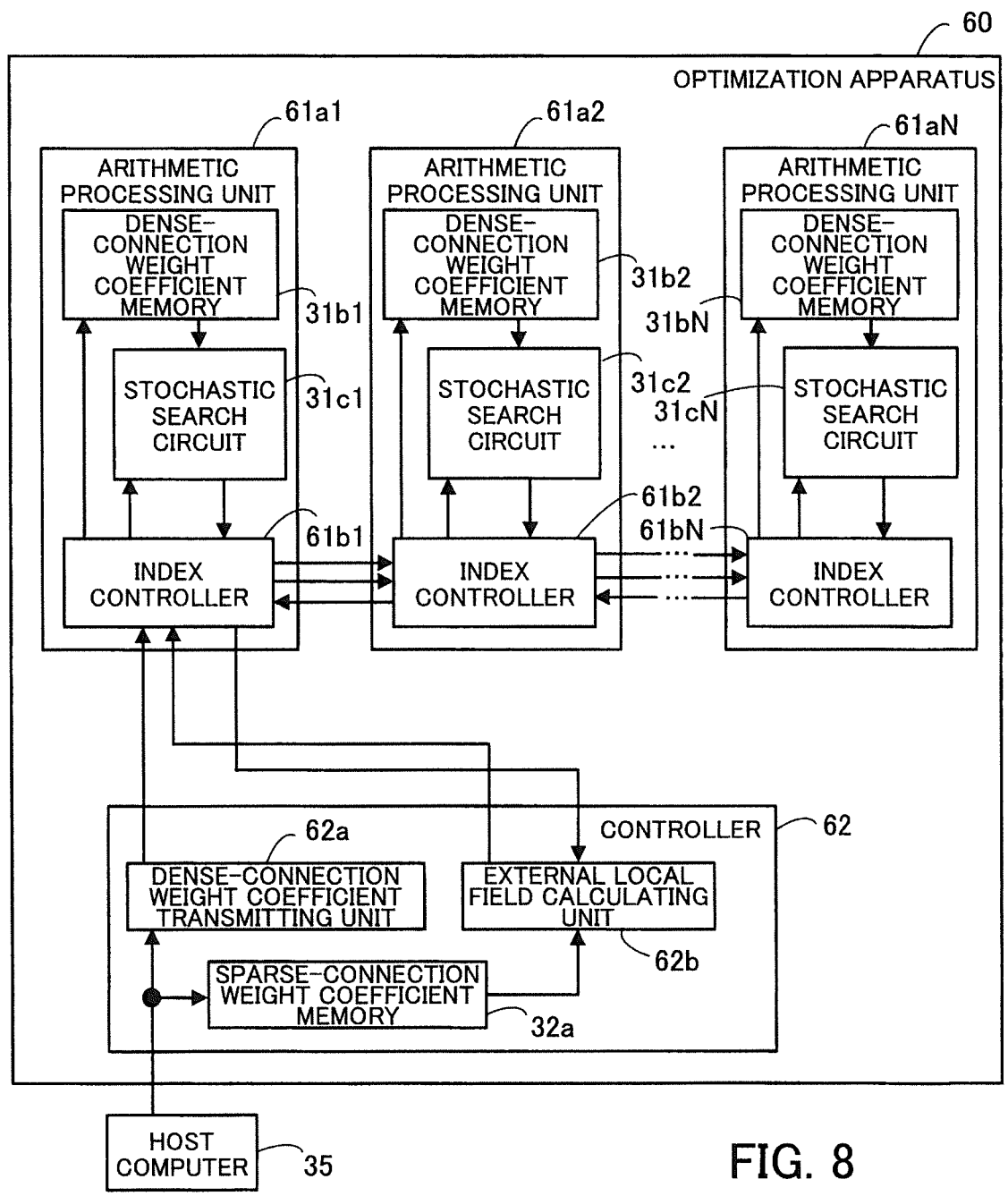
FIG. 8 illustrates an exemplary optimization apparatus according to a third embodiment.

FIG. 8 illustrates an exemplary optimization apparatus according to a third embodiment. In FIG. 8, like reference numerals refer to identical components of the optimization apparatus 30 in FIG. 2 according to the second embodiment.

In an optimization apparatus 60 of the third embodiment, arithmetic processing units 61a1, 61a2, . . . , and 61aN are connected by index controllers 61b1, 61b2, . . . . , and 61bN in a bus topology. Then, a controller 62 is connected to one of the arithmetic processing units 61a1 to 61aN. Note that the network connection is not limited to the bus topology; instead, a ring topology may be employed in which the arithmetic processing units 61a1 and 61aN are directly connected to each other.

In the example of FIG. 8, the controller 62 is connected to the arithmetic processing unit 61a1, and a dense-connection weight coefficient transmitting unit 62a transmits all dense-connection weight coefficients and their indexes to the arithmetic processing unit 61a1. In addition, an external local field calculating unit 62b receives values of all neurons and their indexes from the arithmetic processing unit 61a1, and transmits all external local fields calculated to the arithmetic processing unit 61a1.

Each of the index controllers 61b1 to 61bN receives dense-connection weight coefficients, external local fields, and their indexes from an arithmetic processing unit located to its immediate left (hereinafter simply referred to as the "left adjacent arithmetic processing unit") in FIG. 8. Note, however, that the index controller 61b1 receives them from the controller 62. Then, the index controllers 61b1 to 61bN individually identify, based on the indexes, dense-connection weight coefficients and external local fields associated with a neuron group belonging to itself. Subsequently, the index controllers 61b1 to 61bN store the identified dense-connection weight coefficients in the dense-connection weight coefficient memory units 31b1 to 31bN, respectively, and provide the identified external local fields to the stochastic search circuits 31c1 to 31cN, respectively.

In addition, each of the index controllers 61b1 to 61bN, except for the index controller 61bN, transmits dense-connection weight coefficients and external local fields associated with neuron groups not belonging to itself and their indexes to an arithmetic processing unit located to its immediate right (simply the "right adjacent arithmetic processing unit") in FIG. 8.

Further, the index controllers 61b2 to 61bN individually transmit values of neuron groups and their indexes output from the stochastic search circuits 31c1 to 31cN, to its left adjacent arithmetic processing unit in FIG. 8.

In addition, each of the index controllers 61b1 to 61bN, except for the index controller 61bN, receives values of neuron groups belonging to all arithmetic processing units located on its right side in FIG. 8 and their indexes. Then, each of the index controllers 61b1 to 61bN, except for the index controller 61bN, transmits the received values and indexes to its left adjacent arithmetic processing unit in FIG. 8. Note, however, that the index controller 61b1 transmits them to the controller 62.

Figure 9:
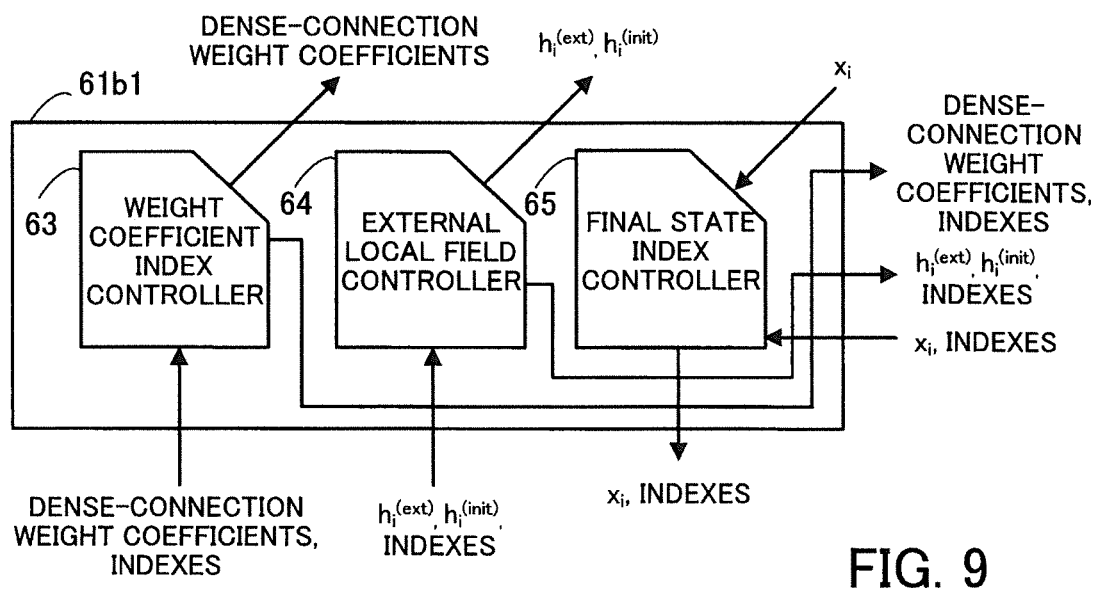
FIG. 9 illustrates an exemplary index controller provided in the optimization apparatus according to the third embodiment.

FIG. 9 illustrates an exemplary index controller provided in the optimization apparatus according to the third embodiment. The following describes the index controller 61b1 as an example; however, each of the index controllers 61b2 to 61bN may be implemented using a similar circuit structure.

The index controller 61b1 includes a weight coefficient index controller 63, an external local field controller 64, and a final state index controller 65.

The weight coefficient index controller 63 receives, from the controller 62, dense-connection weight coefficients and indexes indicating the connection of two neurons, with which each of the dense-connection weight coefficients is associated. Then, the weight coefficient index controller 63 identifies, based on the indexes, dense-connection weight coefficients associated with a neuron group belonging to itself. Subsequently, the weight coefficient index controller 63 stores the identified dense-connection weight coefficients in the dense-connection weight coefficient memory 31b1.

In addition, the weight coefficient index controller 63 transmits dense-connection weight coefficients associated with neuron groups not belonging to itself and their indexes to its right adjacent arithmetic processing unit 61a2 in FIG. 8.

The external local field controller 64 receives, from the controller 62, initial values $h_i^{(init)}$ or external local fields $h_i^{(ext)}$ and indexes indicating neurons with which the initial values $h_i^{(init)}$ or external local fields $h_i^{(ext)}$ are individually associated. Then, the external local field controller 64 identifies, based on the indexes, initial values $h_i^{(init)}$ or external local fields $h_i^{(ext)}$ associated with a neuron group belonging to itself. Subsequently, the external local field controller 64 provides the identified initial values $h_i^{(init)}$ or external local fields $h_i^{(ext)}$ to the stochastic search circuit 31c1.

In addition, the external local field controller 64 transmits initial values $h_i^{(init)}$ or external local fields $h_i^{(ext)}$ associated with neuron groups not belonging to itself and their indexes to its right adjacent arithmetic processing unit 61a2 in FIG. 8.

The final state index controller 65 receives values of neurons from individual registers of the neuron circuits 40a1 to 40an depicted in FIG. 3, adds indexes to the received values, and then transmits the values with the indexes to the controller 62. In addition, the final state index controller 65 receives, from the arithmetic processing unit 61a2, values of neuron groups belonging to the arithmetic processing units 61a2 to 62aN and their indexes, and then transmits them to the controller 62.

Figure 10:
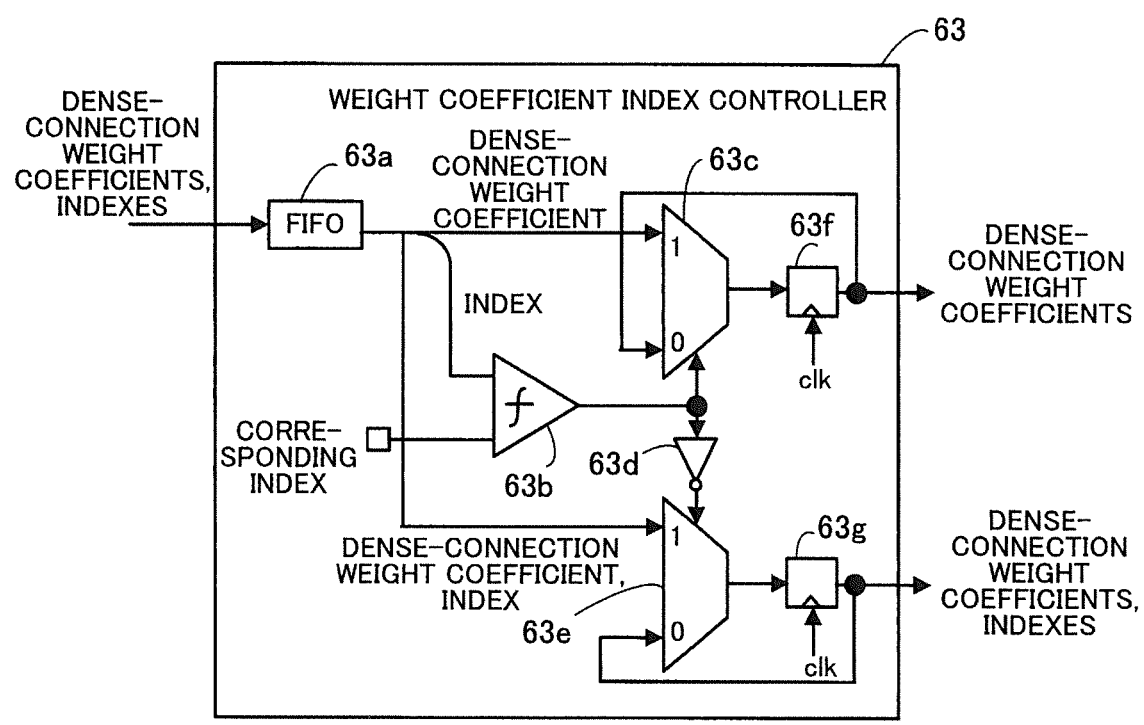
FIG. 10 illustrates another exemplary weight coefficient index controller.

FIG. 10 illustrates an exemplary weight coefficient index controller.

The weight coefficient index controller 63 includes a FIFO 63a, a comparison circuit 63b, a selection circuit 63c, an inverter circuit 63d, a selection circuit 63e, and registers 63f and 63g.

After the dense-connection weight coefficients and their indexes are input to the FIFO 63a, each dense-connection weight coefficient is fed to the selection circuit 63c while its index is fed to the comparison circuit 63b. Further, the pair of the dense-connection weight coefficient and the index is fed to the selection circuit 63e.

The comparison circuit 63b outputs 1 if the index fed thereto matches an index of a weight coefficient associated with the connection between neurons belonging to the arithmetic processing unit 61a1 (corresponding index), pre-stored in a register (not illustrated), for example. On the other hand, the comparison circuit 63b outputs 0 if the index fed thereto does not match the corresponding index.

The selection circuit 63c selects, according to the signal output from the comparison circuit 63b, one of the dense-connection weight coefficient output from the FIFO 63a and a dense-connection weight coefficient stored in the register 63f, and outputs the selected dense-connection weight coefficient. Specifically, the selection circuit 63c selects and outputs the dense-connection weight coefficient output from the FIFO 63a when the comparison circuit 63b outputs 1, and selects and outputs the dense-connection weight coefficient stored in the register 63f when the comparison circuit 63b outputs 0.

The inverter circuit 63d inverts the signal output from the comparison circuit 63b. The inverter circuit 63d outputs 1 when the comparison circuit 63b outputs 0, and outputs 0 when the comparison circuit 63b outputs 1.

The selection circuit 63e selects, according to the signal output from the inverter circuit 63d, one of the paired dense-connection weight coefficient and index output from the FIFO 63a and paired dense-connection weight coefficient and index stored in the register 63g, and outputs the selected pair. Specifically, when the inverter circuit 63d outputs 1, the selection circuit 63e selects and outputs the paired dense-connection weight coefficient and index output from the FIFO 63a. On the other hand, when the inverter circuit 63d outputs 0, the selection circuit 63e selects and outputs the paired dense-connection weight coefficient and index stored in the register 63g.

The register 63f registers the dense-connection weight coefficient output from the selection circuit 63c, in synchronization with the clock signal clk. The dense-connection weight coefficient held in the register 63f is to be provided to the dense-connection weight coefficient memory 31b1.

The register 63g registers the paired dense-connection weight coefficient and index output from the selection circuit 63e, in synchronization with the clock signal clk. The paired dense-connection weight coefficient and index held in the register 63g are to be provided to the arithmetic processing unit 61a2.

The external local field controller 64 of FIG. 9 may be implemented using a similar circuit to the weight coefficient index controller 63 of FIG. 10.

Figure 11:
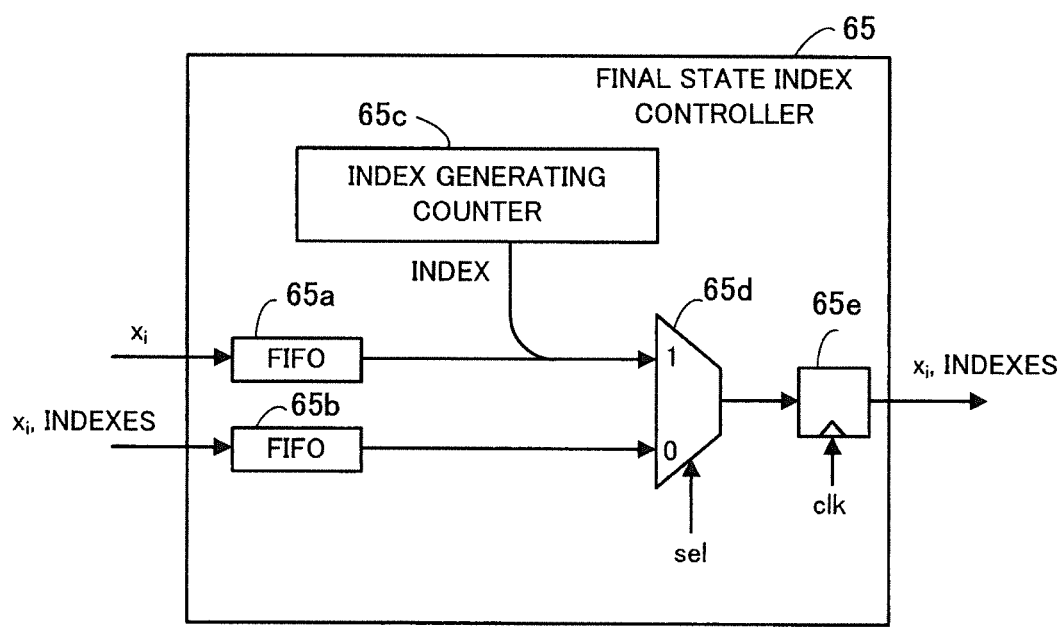
FIG. 11 illustrates another exemplary final state index controller.

FIG. 11 illustrates an exemplary final state index controller.

The final state index controller 65 includes FIFOs 65a and 65b, an index generating counter 65c, a selection circuit 65d, and a register 65e.

The FIFO 65a acquires the value $x_i$ of each neuron sequentially from individual registers of the neuron circuits 40a1 to 40an depicted in FIG. 3, and then outputs the individual values $x_i$ in the order of acquisition.

The FIFO 65b acquires pairs of the value $x_i$ of each neuron belonging to the arithmetic processing units 61a2 to 62aN and its index, provided by the arithmetic processing unit 61a2, and outputs each pair in the order of provision.

The index generating counter 65c outputs an index, and also increments the index to be output therefrom according to the timing of the FIFO 65a outputting each value xi.

The selection circuit 65d selects and outputs a pair made of the value $x_i$ output from the FIFO 65a and the index output from the index generating counter 65c when a selection signal sel provided by a selection signal generating circuit (not illustrated) is 1. On the other hand, when the selection signal sel is 0, the selection circuit 65d selects and outputs the paired value $x_i$ of a neuron and its index output from the FIFO 65b.

For example, the selection signal generating circuit (not illustrated) sets the selection signal sel to 1 until the index generating counter 65c generates indexes for values of n neurons, and then sets the selection signal sel to 0 thereafter.

The register 65e registers therein the value $x_i$ and its index output from the selection circuit 65d, in synchronization with the clock signal clk. The value $x_i$ and index held in the register 65e are to be provided to the controller 62.

Next described is an overall operation flow of the optimization apparatus according to the third embodiment, with reference to a flowchart.

Figure 12:
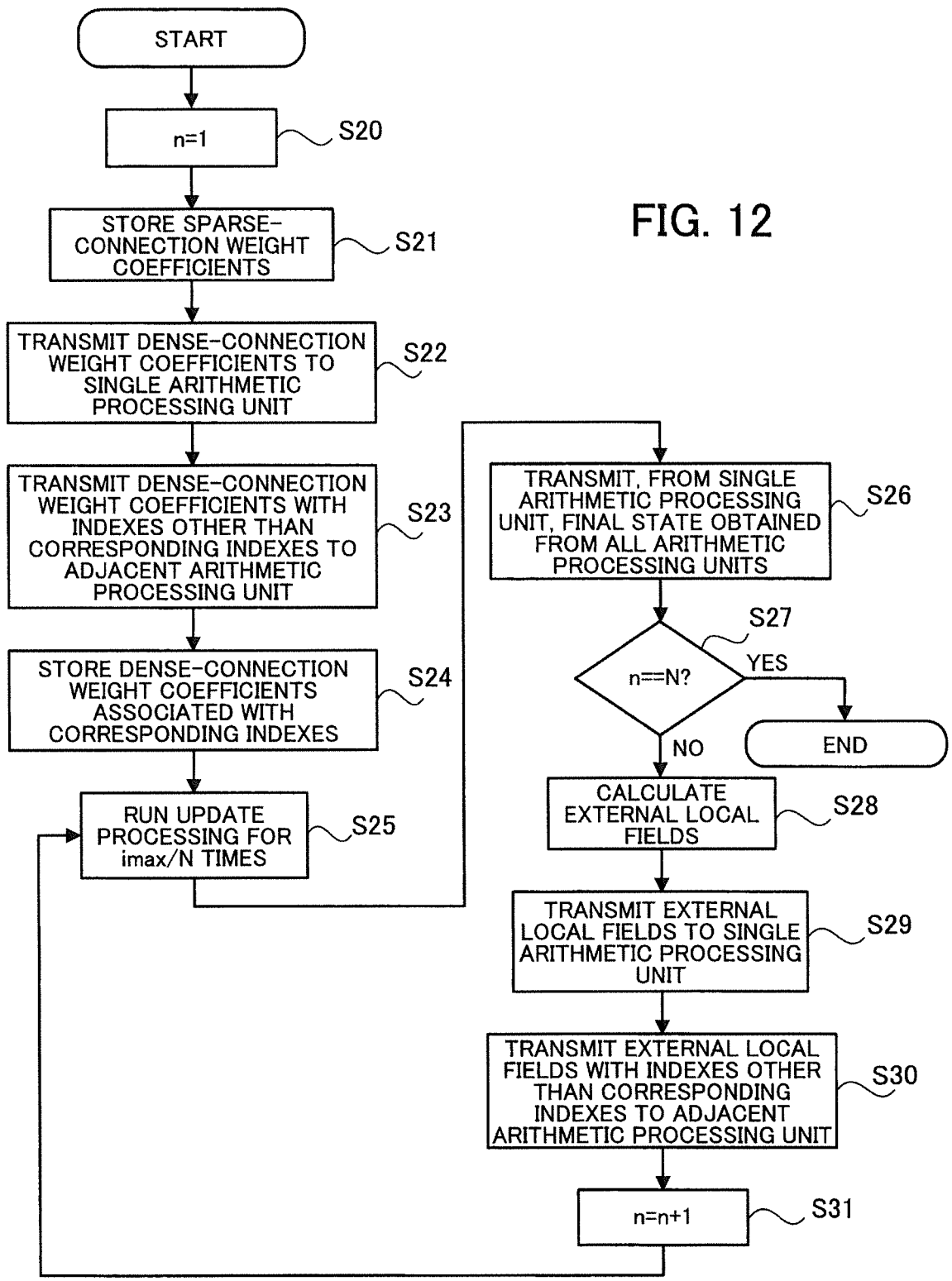
FIG. 12 is a flowchart illustrating an exemplary operation flow of the optimization apparatus according to the third embodiment.

FIG. 12 is a flowchart illustrating an exemplary operation flow of the optimization apparatus according to the third embodiment.

The procedure of steps S20 and 21 is the same as that of steps S10 and S11 in FIG. 7. After step S21, the controller 62 transmits dense-connection weight coefficients (and their indexes) to the single arithmetic processing unit 61a1 (step S22). Then, the arithmetic processing unit 61a1 transmits dense-connection weight coefficients associated with indexes other than its corresponding indexes to the adjacent arithmetic processing unit 61a2 (step S23). The remaining arithmetic processing units 61a2 to 61aN, except for the arithmetic processing unit 61aN, individually carry out the same procedure.

Subsequently, the procedure of steps S24 and S25 similar to that of steps S13 and S14 in FIG. 7 is performed.

Subsequently, values of all neurons belonging to the arithmetic processing units 61a1 to 61aN (and their indexes) are gathered together in the arithmetic processing unit 61a1, and then transmitted from the arithmetic processing unit 61a1 to the controller 62 as the final state (step S26).

The procedure of steps S27 and S28 is the same as that of steps S16 and S17 in FIG. 7.

After step S28, the controller 62 transmits the calculated external local fields (and their indexes) to the single arithmetic processing unit 61a1 (step S29). Then, the arithmetic processing unit 61a1 transmits external local fields associated with indexes other than its corresponding indexes to the adjacent arithmetic processing unit 61a2 (step S30). The remaining arithmetic processing units 61a2 to 61aN, except for the arithmetic processing unit 61aN, individually carry out the same procedure. The controller 62 also increments the count value n (step S31). Subsequently, the process returns to step S25 to be repeated.

When the count value n has reached N, the optimization apparatus 60 ends the process of solving the optimization problem. Note that, when the count value n has reached N, for example, the controller 62 transmits the value of each neuron obtained at that point to the host computer 35 as the solution of the optimization problem.

According to the above-described optimization apparatus 60 of the third embodiment, it is possible to find an optimal solution by mapping a massive optimization problem to the optimization apparatus 60, as in the case with the optimization apparatus 10 of the first embodiment. In addition, by connecting the index controller 61b1 of the single arithmetic processing unit 61a1 to the controller 62, it is possible to reduce the number of wiring connections between the controller 62 and the arithmetic processing units 61a1 to 61aN.

Note that, in the example of FIG. 8, the leftmost arithmetic processing unit 61a1 is connected to the controller 62. However, the applicable scope of the technology according to the third embodiment is not limited to this example, and the rightmost arithmetic processing unit 61aN or an arithmetic processing unit located in the middle may be connected to the controller 62. In that case, the transmission direction of data, such as dense-connection weight coefficients, simply needs to be changed.

(d) Fourth Embodiment

Figure 13:
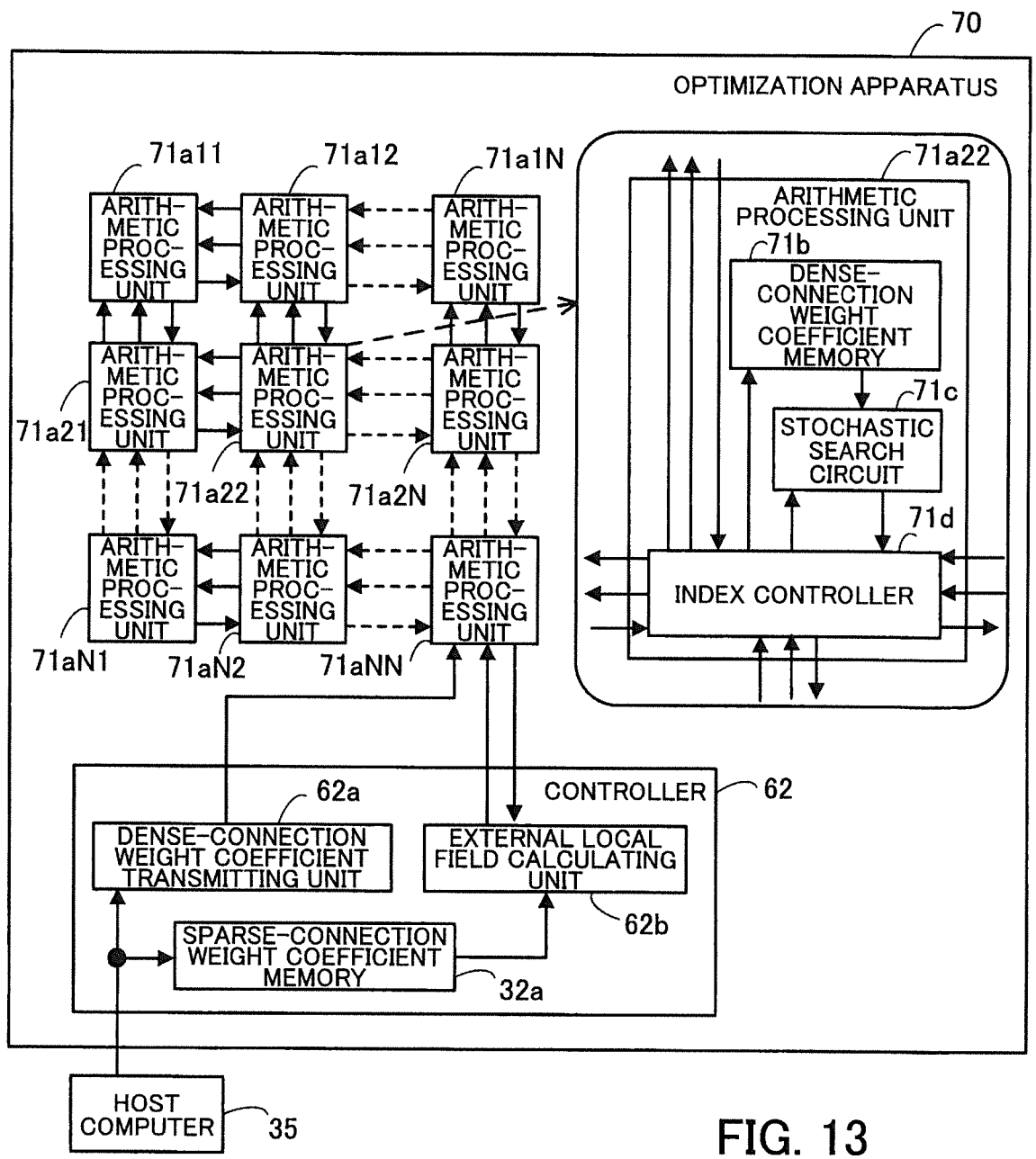
FIG. 13 illustrates an exemplary optimization apparatus according to a fourth embodiment.

FIG. 13 illustrates an exemplary optimization apparatus according to a fourth embodiment. In FIG. 13, like reference numerals refer to identical components of the optimization apparatus 60 in FIG. 8 according to the third embodiment.

In an optimization apparatus 70 of the fourth embodiment, N×N arithmetic processing units 71a11, 71a12, . . . , 71a1N, 71a21, 71a22, . . . , 71a2N, . . . , 71aN1, 71aN2, . . . , and 71aNN are connected in a two-dimensional mesh topology. Then, the controller 62 is connected to one of the arithmetic processing units 71a11 to 71aNN. Note that the network connection is not limited to the mesh topology; instead, a torus topology may be employed in which the arithmetic processing units 71a11 and 71a1N, the arithmetic processing units 71a21 and 71a2N, . . . , and the arithmetic processing units 71aN1 and 71aNN are individually and directly connected to each other.

In the example of FIG. 13, the controller 62 is connected to the arithmetic processing unit 71aNN, and the dense-connection weight coefficient transmitting unit 62a transmits all dense-connection weight coefficients and their indexes to the arithmetic processing unit 71aNN. In addition, the external local field calculating unit 62b receives values of all neurons and their indexes from the arithmetic processing unit 71aNN, and transmits all external local fields calculated to the arithmetic processing unit 71aNN.

Each of the arithmetic processing units 71a11 to 71aNN includes an index controller (e.g. an index controller 71d).

The index controller receives dense-connection weight coefficients, external local fields, and their indexes, for example, from an arithmetic processing unit located to its immediate right or one located immediately therebelow in FIG. 13 (the former is hereinafter simply referred to as the "right adjacent arithmetic processing unit", and the latter as the "bottom adjacent arithmetic processing unit"). Note, however, that the index controller of the arithmetic processing unit 71aNN receives them from the controller 62. Then, the index controller identifies, based on the indexes, dense-connection weight coefficients and external local fields associated with a neuron group belonging to itself. Subsequently, the index controller stores the identified dense-connection weight coefficients in a dense-connection weight coefficient memory (e.g. a dense-connection weight coefficient memory 71b), and provides the identified external local fields to a stochastic search circuit (e.g. a stochastic search circuit 71c).

In addition, each of the index controllers included in the arithmetic processing units 71a12 to 71aNN transmits dense-connection weight coefficients and external local fields associated with neuron groups not belonging to itself and their indexes to an arithmetic processing unit located to its immediate left or one located immediately thereabove in FIG. 13 (the former is hereinafter simply referred to as the "left adjacent arithmetic processing unit", and the latter as the "top adjacent arithmetic processing unit").

Further, each index controller transmits values of its neuron group and their indexes output from the stochastic search circuit to its right or bottom adjacent arithmetic processing unit in FIG. 13. Note, however, that the index controller of the arithmetic processing unit 71aNN transmits them to the controller 62.

In addition, each of the index controllers included in the arithmetic processing units 71a12 to 71aNN transfers values of neuron groups and their indexes received from its left or top adjacent arithmetic processing unit in FIG. 13, to its right or bottom adjacent arithmetic processing unit.

Figure 14:
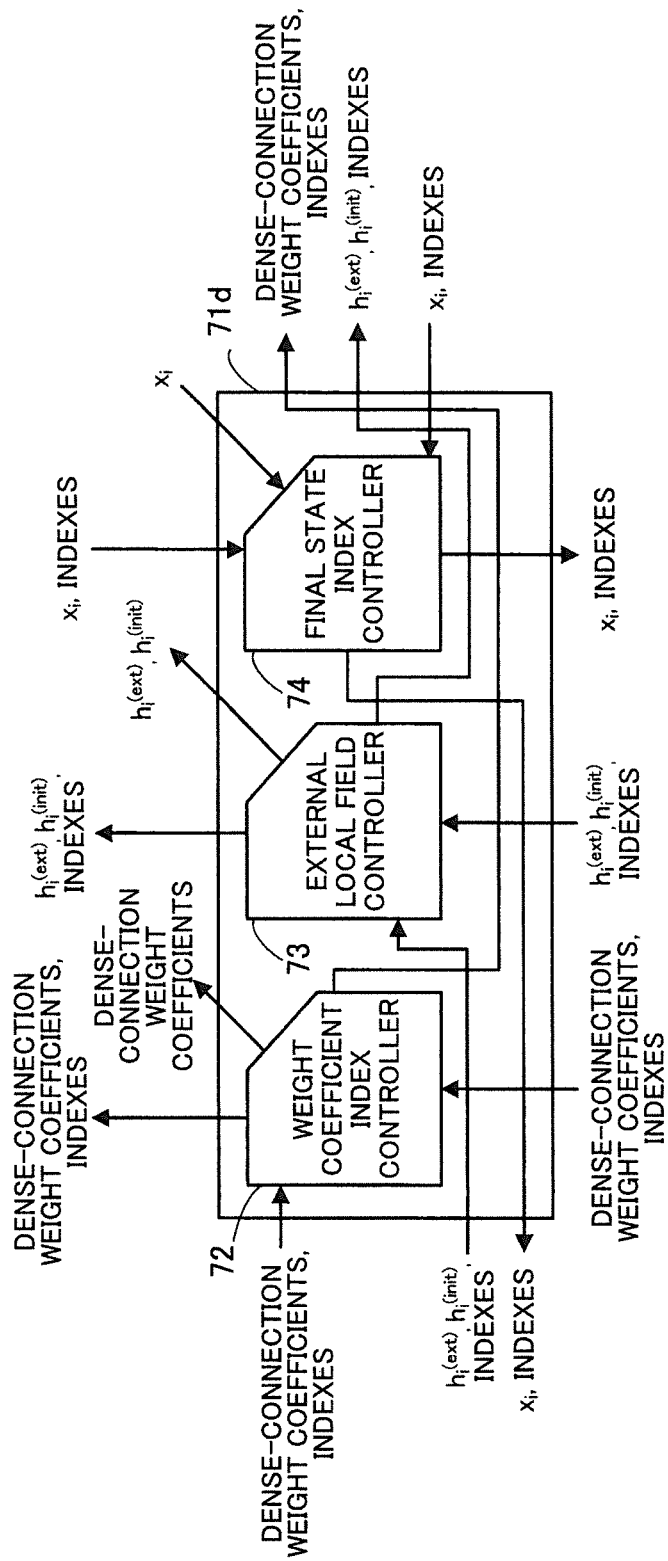
FIG. 14 illustrates an exemplary index controller provided in the optimization apparatus according to the fourth embodiment.

FIG. 14 illustrates an exemplary index controller provided in the optimization apparatus according to the fourth embodiment. The following describes the index controller 71d included in the arithmetic processing unit 71a22 as an example; however, the index controllers included in the remaining arithmetic processing units may be implemented using a similar circuit structure.

The index controller 71d includes a weight coefficient index controller 72, an external local field controller 73, and a final state index controller 74.

The weight coefficient index controller 72 receives dense-connection weight coefficients and their indexes from the right or bottom adjacent arithmetic processing unit in FIG. 13. Then, the weight coefficient index controller 72 identifies, based on the indexes, dense-connection weight coefficients associated with a neuron group belonging to itself, and then stores the identified dense-connection weight coefficients in the dense-connection weight coefficient memory 71b.

In addition, the weight coefficient index controller 72 transmits dense-connection weight coefficients associated with neuron groups not belonging to itself and their indexes to the left or top adjacent arithmetic processing unit in FIG. 13.

The external local field controller 73 receives, from the right or bottom adjacent arithmetic processing unit in FIG. 13, initial values $h_i^{(init)}$ or external local fields $h_i^{(ext)}$ and indexes indicating neurons with which the initial values $f_i^{(init)}$ or external local fields $h_i^{(ext)}$ are individually associated. Then, the external local field controller 73 identifies, based on the indexes, initial values $h_i^{(init)}$ or external local fields $h_i^{(ext)}$ associated with a neuron group belonging to itself. Subsequently, the external local field controller 73 provides the identified initial values $h_i^{(init)}$ or external local fields $h_i^{(ext)}$ to the stochastic search circuit 71c.

In addition, the external local field controller 73 transmits initial values $h_i^{(init)}$ or external local fields $h_i^{(ext)}$ associated with neuron groups not belonging to itself and their indexes to the left or top adjacent arithmetic processing unit in FIG. 13.

The final state index controller 74 receives values of neurons from individual registers of the neuron circuits 40a1 to 40an depicted in FIG. 3, adds indexes to the received values, and then transmits the values with the indexes to the right or bottom adjacent arithmetic processing unit in FIG. 13.

The final state index controller 74 also transfers values of neuron groups and their indexes received from the left or top adjacent arithmetic processing unit, to the right or bottom adjacent arithmetic processing unit in FIG. 13.

Figure 15:
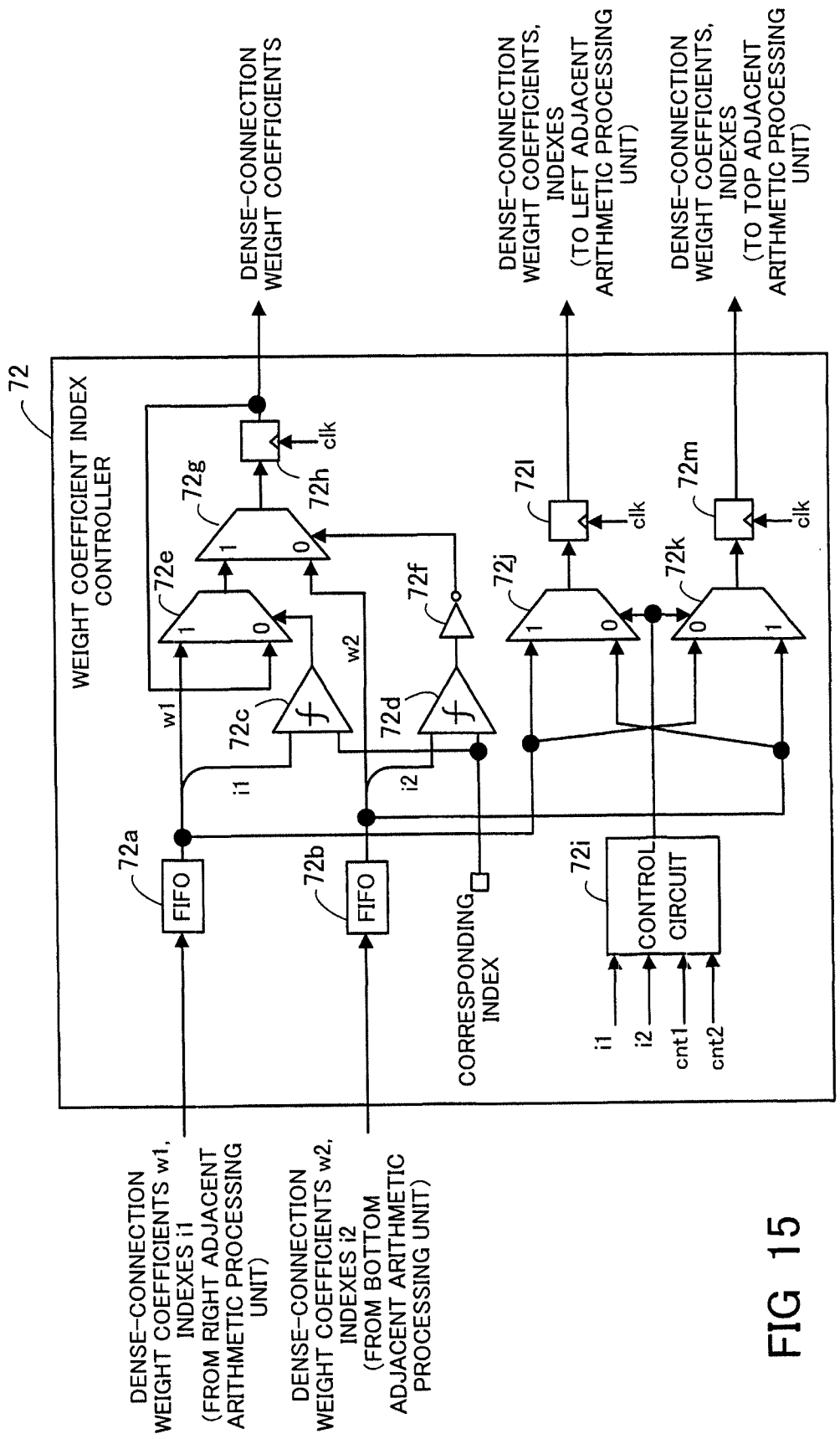
FIG. 15 illustrates yet another exemplary weight coefficient index controller.

FIG. 15 illustrates an exemplary weight coefficient index controller.

The weight coefficient index controller 72 includes FIFOs 72a and 72b, comparison circuits 72c and 72d, a selection circuits 72e, an inverter circuit 72f, a selection circuit 72g, a register 72h, a control circuit 72i, selection circuits 72j and 72k, and registers 72l and 72m.

After dense-connection weight coefficients w1 and their indexes i1 provided by the right adjacent arithmetic processing unit are input to the FIFO 72a, each dense-connection weight coefficient w1 is fed to the selection circuit 72e while its index i1 is fed to the comparison circuit 72c. Further, the pair of the dense-connection weight coefficient w1 and the index i1 is fed to the selection circuit 72j.

After dense-connection weight coefficients w2 and their indexes i2 provided by the bottom adjacent arithmetic processing unit are input to the FIFO 72b, each dense-connection weight coefficient w2 is fed to the selection circuit 72g while its index i2 is fed to the comparison circuit 72d. Further, the pair of the dense-connection weight coefficient w2 and the index i2 is fed to the selection circuit 72k.

The comparison circuit 72c outputs 1 if the index i1 fed thereto matches an index of a weight coefficient associated with the connection between neurons belonging to the arithmetic processing unit 71a22 (corresponding index), prestored in a register (not illustrated), for example. On the other hand, the comparison circuit 72c outputs 0 if the index fed thereto does not match the corresponding index.

The comparison circuit 72d outputs 1 if the index i2 fed thereto matches the corresponding index, and outputs 0 otherwise.

The selection circuit 72e selects and outputs the dense-connection weight coefficient w1 output from the FIFO 72a if the comparison circuit 72c outputs 1. On the other hand, if the comparison circuit 72c outputs 0, the selection circuit 72e selects and outputs a dense-connection weight coefficient stored in the register 72h.

The inverter circuit 72f inverts the signal output from the comparison circuit 72d. The inverter circuit 72f outputs 1 when the comparison circuit 72d outputs 0, and outputs 0 when the comparison circuit 72d outputs 1.

The selection circuit 72g selects and outputs the dense-connection weight coefficient output from the selection circuit 72e when the inverter circuit 72f outputs 1. On the other hand, if the inverter circuit 72f outputs 0, the selection circuit 72g selects and outputs the dense-connection weight coefficient w2 output from the FIFO 72b.

The register 72h registers the dense-connection weight coefficient output from the selection circuit 72g, in synchronization with the clock signal clk. The dense-connection weight coefficient held in the register 72h is to be provided to the dense-connection weight coefficient memory 71b.

The control circuit 72i generates, based on the indexes i1 and i2 and control signals cnt1 and cnt2, a selection signal to be provided to the selection circuits 72j and 72k and outputs the generated selection signal. The control signal cnt1 is provided by the right adjacent arithmetic processing unit, and indicates that the rightward communication path is open. The control signal cnt2 is provided by the bottom adjacent arithmetic processing unit, and indicates that the downward communication path is open.

In the case where the rightward communication path is open, the control circuit 72i determines, according to the index i1, to which one of the left and top adjacent arithmetic processing units the dense-connection weight coefficient w1 and the index i1 are to be transmitted in order to deliver them to a corresponding arithmetic processing unit along a shorter path. The control circuit 72i outputs 1 if the dense-connection weight coefficient w1 and the index i1 are to be routed over a shorter communication path by transmitting them to, not the top adjacent arithmetic processing unit, but the left adjacent arithmetic processing unit, and outputs 0 in the contrary case.

In the case where the downward communication path is open, the control circuit 72i determines, according to the index i2, to which one of the left and top adjacent arithmetic processing units the dense-connection weight coefficient w2 and the index i2 are to be transmitted in order to deliver them to a corresponding arithmetic processing unit along a shorter path. The control circuit 72i outputs 1 if the dense-connection weight coefficient w2 and the index i2 are to be routed over a shorter communication path by transmitting them to, not the top adjacent arithmetic processing unit, but the left adjacent arithmetic processing unit, and outputs 0 in the contrary case.

The selection circuit 72j selects and outputs the paired dense-connection weight coefficient w1 and index i1 when the selection signal output from the control circuit 72i is 1. On the other hand, if the selection signal is 0, the selection circuit 72j selects and outputs the paired dense-connection weight coefficient w2 and index i2.

The selection circuit 72k selects and outputs the paired dense-connection weight coefficient w2 and index i2 when the selection signal output from the control circuit 72i is 1. On the other hand, if the selection signal is 0, the selection circuit 72k selects and outputs the paired dense-connection weight coefficient w1 and index i1.

The register 72l registers the paired dense-connection weight coefficient and index output from the selection circuit 72j, in synchronization with the clock signal clk. The paired dense-connection weight coefficient and index held in the register 72l are to be provided to an arithmetic processing unit located to the immediate left of the arithmetic processing unit 71a22 (the arithmetic processing unit 71a21 in the example of FIG. 13).

The register 72m registers the paired dense-connection weight coefficient and index output from the selection circuit 72k, in synchronization with the clock signal clk. The paired dense-connection weight coefficient and index held in the register 72m are to be provided to an arithmetic processing unit located immediately above the arithmetic processing unit 71a22 (the arithmetic processing unit 71a12 in the example of FIG. 13).

The external local field controller 73 of FIG. may be implemented using a similar circuit to the weight coefficient index controller 72 of FIG. 15.

Figure 16:
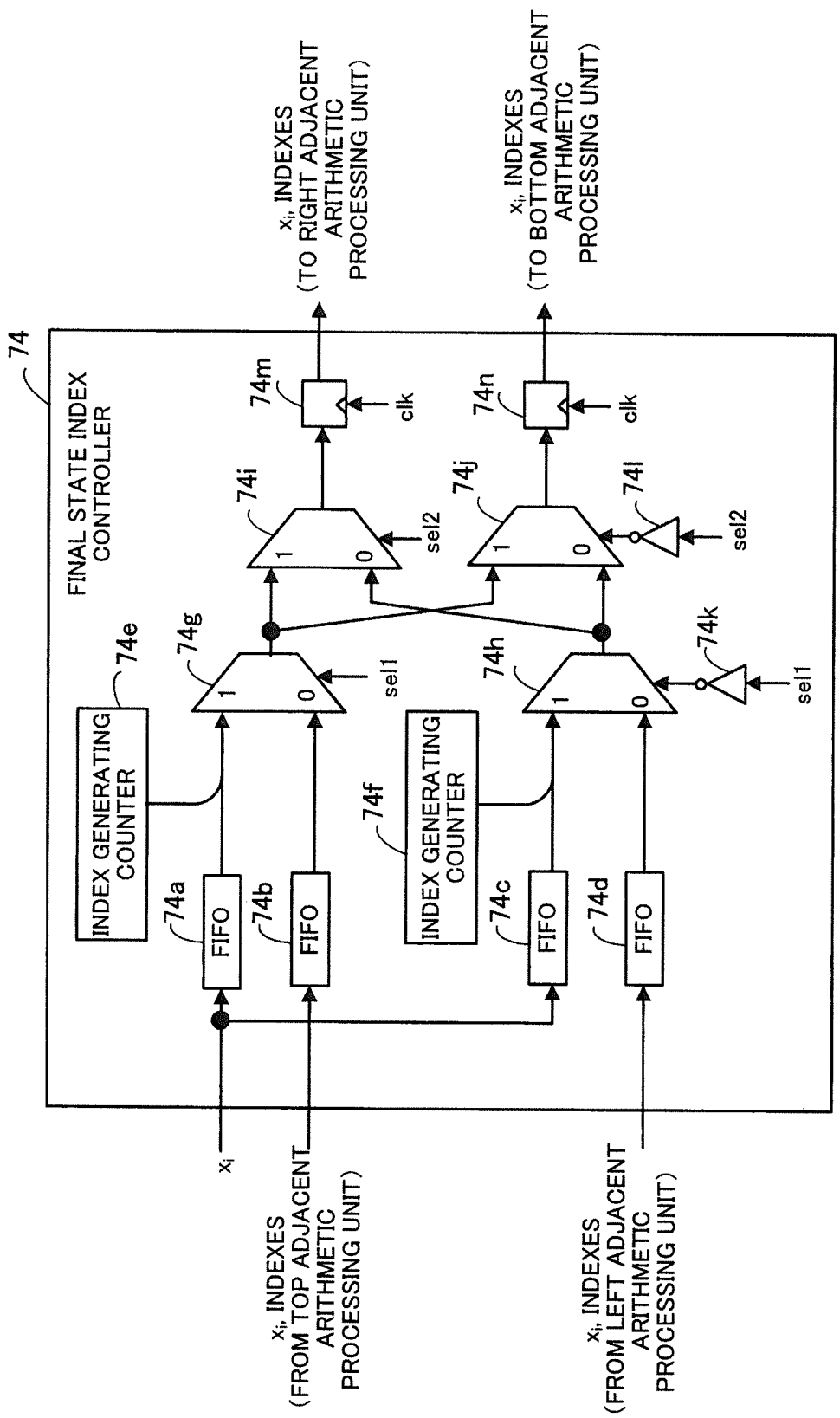
FIG. 16 illustrates yet another exemplary final state index controller.

FIG. 16 illustrates an exemplary final state index controller.

The final state index controller 74 includes FIFOs 74a, 74b, 74c, and 74d, index generating counters 74e and 74f, selection circuits 74g, 74h, 74i, and 74j, inverter circuits 74k and 74l, and registers 74m and 74n.

The FIFOs 74a and 74c individually acquire the value $x_i$ of each neuron sequentially from individual registers of the neuron circuits 40a1 to 40an depicted in FIG. 3, and then output the values xi in the order of acquisition.

The FIFO 74b acquires pairs of the value $x_i$ of each neuron and its index, provided by the top adjacent arithmetic processing unit, and outputs the pairs in the order of provision.

The FIFO 74d acquires pairs of the value $x_i$ of each neuron and its index, provided by the left adjacent arithmetic processing unit, and outputs the pairs in the order of provision.

The index generating counters 74e and 74f individually output an index, and also increment the index to be output therefrom according to the timing of the FIFOs 74a and 74c, respectively, outputting each value $x_i$.

The selection circuit 74g selects and outputs a pair made of the value $x_i$ output from the FIFO 74a and the index output from the index generating counter 74e when a selection signal sel1 provided by a selection signal generating circuit (not illustrated) is 1. On the other hand, when the selection signal sel1 is 0, the selection circuit 74g selects and outputs the paired value $x_i$ and index output from the FIFO 74b.

For example, the selection signal generating circuit (not illustrated) sets the selection signal sel1 to 1 until the index generating counter 74e generates indexes for values of n neurons, and then sets the selection signal sel1 to 0 thereafter.

The selection circuit 74h receives, as a selection signal, a value obtained by the inverter circuit 74k inverting the selection signal sel1. Then, the selection circuit 74h selects and outputs a pair made of the value $x_i$ output from the FIFO 74c and the index output from the index generating counter 74f when the selection signal sel1 is 0. On the other hand, when the selection signal sel1 is 1, the selection circuit 74h selects and outputs the paired value $x_i$ and index output from the FIFO 74d.

The selection circuit 74i selects and outputs the paired value $x_i$ and index output from the selection circuit 74g when a selection signal sel2 provided by a selection signal generating circuit (not illustrated) is 1. On the other hand, when the selection signal sel2 is 0, the selection circuit 74i selects and outputs the paired value $x_i$ and index output from the selection circuit 74h.

The selection circuit 74j receives, as a selection signal, a value obtained by the inverter circuit 74l inverting the selection signal sel2. Then, the selection circuit 74j selects and outputs the paired value $x_i$ and index output from the selection circuit 74g when the selection signal sel2 is 0. On the other hand, when the selection signal sel2 is 1, the selection circuit 74j selects and outputs the paired value $x_i$ and index output from the selection circuit 74h.

For example, the selection signal generating circuit (not illustrated) sets the selection signal sel2 to 1 in the case where the paired value $x_i$ and index are to be routed over a shorter communication path by transmitting them to, not the bottom adjacent arithmetic processing unit, but the right adjacent arithmetic processing unit.

The register 74m registers the paired value $x_i$ and index output from the selection circuit 74i, in synchronization with the clock signal clk. The value $x_i$ and index held in the register 74m are to be provided to the arithmetic processing unit located to the immediate right of the arithmetic processing unit 71a22.

The register 74n registers the paired value $x_i$ and index output from the selection circuit 74j, in synchronization with the clock signal clk. The value $x_i$ and index held in the register 74n are to be provided to the arithmetic processing unit located immediately below the arithmetic processing unit 71a22.

Next described is an overall operation flow of the optimization apparatus according to the fourth embodiment, with reference to a flowchart.

Figure 17:
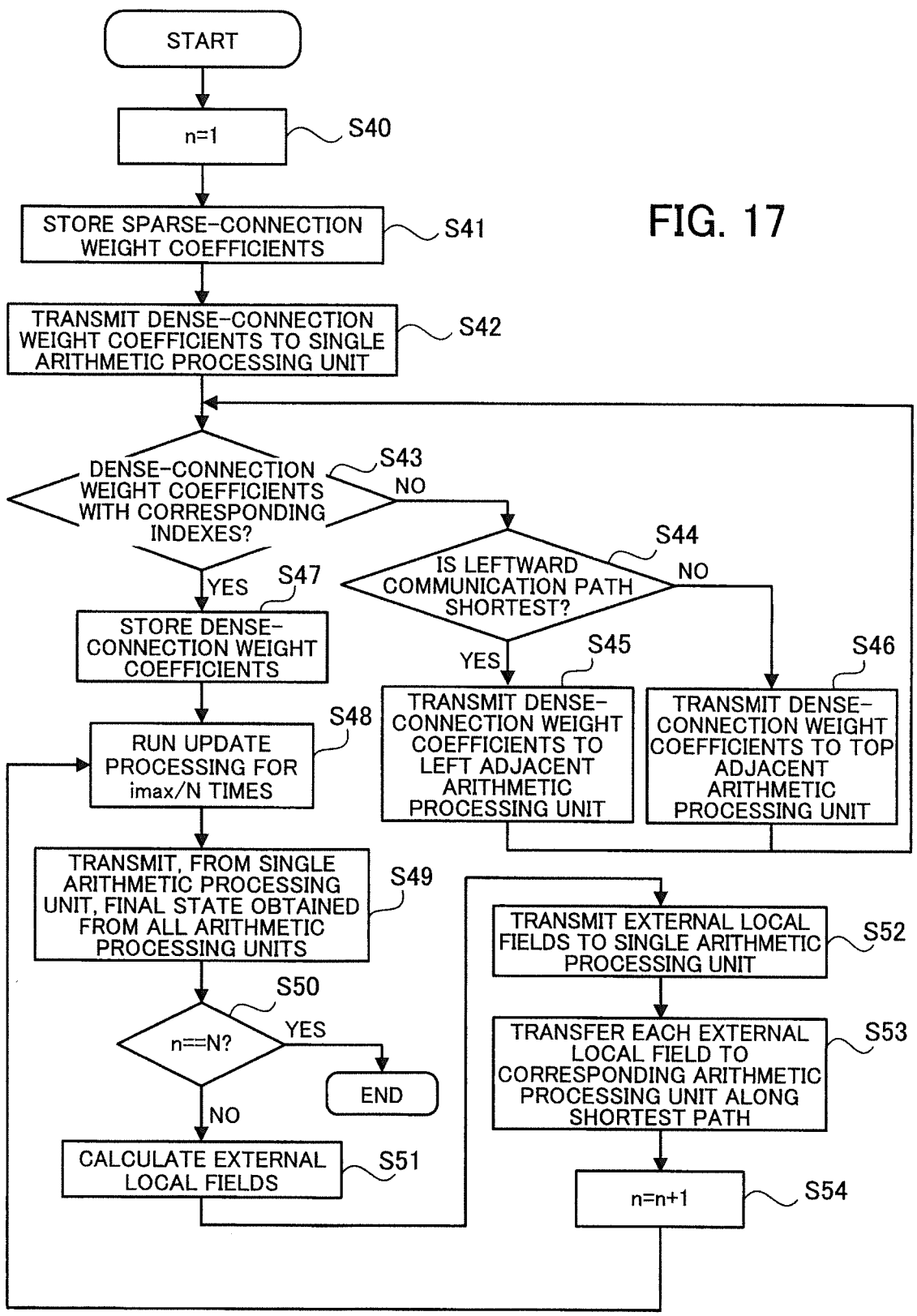
FIG. 17 is a flowchart illustrating an exemplary operation flow of the optimization apparatus according to the fourth embodiment.

FIG. 17 is a flowchart illustrating an exemplary operation flow of the optimization apparatus according to the fourth embodiment.

The procedure of steps S40 and S41 is the same as that of steps S10 and S11 in FIG. 7. After step S41, the controller 62 transmits dense-connection weight coefficients (and their indexes) to the arithmetic processing unit 71aNN (step S42).

If the transmitted dense-connection weight coefficients are not those associated with the aforementioned corresponding indexes (step S43: NO), the index controller equipped in the arithmetic processing unit 71aNN performs the following procedure. If the leftward communication path leading from the arithmetic processing unit 71aNN is the shortest route (step S44: YES), the index controller transmits the dense-connection weight coefficients and their indexes to an arithmetic processing unit located to the immediate left of the arithmetic processing unit 71aNN (step S45). If the leftward communication path leading from the arithmetic processing unit 71aNN is not the shortest route (step S44: NO), the index controller transmits the dense-connection weight coefficients and their indexes to an arithmetic processing unit located immediately above the arithmetic processing unit 71aNN (step S46). After step S45 or S46, step S43 and subsequent steps are repeated in the arithmetic processing unit having received the dense-connection weight coefficients.

If the transmitted dense-connection weight coefficients are those with the aforementioned corresponding indexes (step S43: YES), the procedure of steps S47 and S48 similar to that of steps S13 and S14 in FIG. 7 is performed.

Subsequently, values of all neurons belonging to the arithmetic processing units 71a11 to 71aNN (and their indexes) are gathered together in the arithmetic processing unit 71aNN through the above-described procedure, and then transmitted from the arithmetic processing unit 71aNN to the controller 62 as the final state (step S49).

The procedure of steps S50 and S51 is the same as that of steps S16 and S17 in FIG. 7.

After step S51, the controller 62 transmits the calculated external local fields (and their indexes) to the single arithmetic processing unit 71aNN (step S52). Subsequently, a similar procedure to steps S43 to S46 is carried out to transfer each external local field (with its index) to its corresponding arithmetic processing unit along the shortest path (step S53). The controller 62 also increments the count value n (step S54). Subsequently, the process returns to step S48 to be repeated.

When the count value n has reached N, the optimization apparatus 70 ends the process of solving the optimization problem. Note that, when the count value n has reached N, for example, the controller 62 transmits the value of each neuron obtained at that point to the host computer 35 as the solution of the optimization problem.

According to the above-described optimization apparatus 70 of the fourth embodiment, it is possible to find an optimal solution by mapping a massive optimization problem to the optimization apparatus 70, as in the case with the optimization apparatus 10 of the first embodiment.

In addition, by connecting the single arithmetic processing unit 71aNN to the controller 62, it is possible to reduce the number of wiring connections between the controller 62 and the arithmetic processing units 71a11 to 71aNN. Further, connecting the arithmetic processing units 71a11 to 71aNN in a two-dimensional mesh topology allows an increased number of arithmetic processing units 71a11 to 71aNN to be deployed, which in turn allows mapping of even more massive optimization problems to the optimization apparatus 70. In addition, each of the arithmetic processing units 71a11 to 71aNN selects the shortest communication path to transfer dense-connection weight coefficients and other data, thus reducing time spent on communication.

Note that, in the example of FIG. 13, the bottom-right arithmetic processing unit 71aNN is connected to the controller 62. However, the applicable scope of the technology according to the fourth embodiment is not limited to this example. In the case of connecting a different arithmetic processing unit to the controller 62, the transmission direction of data, such as dense-connection weight coefficients, simply needs to be changed.

Having described aspects of the optimization apparatus and the method for controlling thereof based on the embodiments above, they are merely examples and the particular details of these illustrative examples shall not be construed as limitations on the appended claims.

For example, all the arithmetic processing units are used in the operational examples described above; however, if the magnitude of an optimization problem to be solved is small compared to the number of arithmetic processing units, not all the arithmetic processing units need to be employed. Note that, in the case of the optimization apparatus 60 of the third embodiment, arithmetic processing units to be unused are selected with priority to the rightmost arithmetic processing unit 61aN.

According to an aspect, it is possible to find an optimal solution by mapping a massive optimization problem to an optimization apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optimization apparatus for calculating a minimum of an evaluation function representing energy, the optimization apparatus comprising:

a plurality of arithmetic processing units configured to individually perform computation of values of a predetermined number of neurons amongst a plurality of neurons in a neural network, where the predetermined number of neurons belong to each of the plurality of arithmetic processing units, and each of the predetermined number of neurons belonging to one of the plurality of arithmetic processing units is connected to every other neuron belonging thereto; and a control unit configured to:
   cause each of the plurality of arithmetic processing units to perform the computation by providing the each of the plurality of arithmetic processing units with dense-connection weight coefficients associated with every connection of two neurons belonging thereto, the dense-connection weight coefficients corresponding to a dense-connection part of the evaluation function; and
   calculate changes in the energy using sparse-connection weight coefficients individually associated with a connection of two neurons belonging to different arithmetic processing units, the sparse-connection weight coefficients corresponding to a sparse-connection part of the evaluation function, and subsequently cause each of the plurality of arithmetic processing units to perform the computation by providing the changes.

2. The optimization apparatus according to claim 1, wherein:
   the plurality of arithmetic processing units is connected one-on-one with the control unit.

3. The optimization apparatus according to claim 1, wherein:
   the plurality of arithmetic processing units is connected in a bus or ring topology, and one of the plurality of arithmetic processing units is connected to the control unit.

4. The optimization apparatus according to claim 1, wherein:
   the plurality of arithmetic processing units is connected in a two-dimensional mesh or torus topology, and one of the plurality of arithmetic processing units is connected to the control unit.

5. The optimization apparatus according to claim 4, wherein:
   each of the plurality of arithmetic processing units selects, based on indexes assigned to the dense-connection weight coefficients and the changes, one of a first arithmetic processing unit adjacent thereto in a first direction and a second arithmetic processing unit adjacent thereto in a second direction, through which the dense-connection weight coefficients and the changes are to be routed over a shorter communication path, and transmits the dense-connection weight coefficients and the changes to the one of the first arithmetic processing unit and the second arithmetic processing unit.

6. A method for controlling an optimization apparatus for calculating a minimum of an evaluation function representing energy, the method comprising:
   performing, by each of a plurality of arithmetic processing units, computation of values of a predetermined number of neurons amongst a plurality of neurons in a neural network, where the predetermined number of neurons belong to each of the plurality of arithmetic processing units, and each of the predetermined number of neurons belonging to one of the plurality of arithmetic processing units is connected to every other neuron belonging thereto; and
   causing, by a control unit, each of the plurality of arithmetic processing units to perform the computation by providing the each of the plurality of arithmetic processing units with dense-connection weight coefficients associated with every connection of two neurons belonging thereto, the dense-connection weight coefficients corresponding to a dense-connection part of the evaluation function, calculating changes in the energy using sparse-connection weight coefficients individually associated with a connection of two neurons belonging to different arithmetic processing units, the sparse-connection weight coefficients corresponding to a sparse-connection part of the evaluation function, and subsequently causing each of the plurality of arithmetic processing units to perform the computation by providing the changes.

* * * * *